United States Patent
Shono

(10) Patent No.: US 8,836,301 B2
(45) Date of Patent: Sep. 16, 2014

(54) POWER SUPPLY UNIT

(75) Inventor: Ken Shono, Kawasaki (JP)

(73) Assignee: Transphorm Japan, Inc., Yokohama (JP)

( * ) Notice: Subject to any disclaimer, the term of this patent is extended or adjusted under 35 U.S.C. 154(b) by 257 days.

(21) Appl. No.: 13/459,916

(22) Filed: Apr. 30, 2012

(65) Prior Publication Data

US 2012/0326681 A1    Dec. 27, 2012

(30) Foreign Application Priority Data

Jun. 27, 2011  (JP) ................................. 2011-141512

(51) Int. Cl.
  *H02M 1/084*    (2006.01)
  *H02M 3/158*    (2006.01)
(52) U.S. Cl.
  CPC .................................. *H02M 3/1584* (2013.01)
  USPC ........................................................ 323/272
(58) Field of Classification Search
  CPC .... H02M 1/845; H02M 1/084; H02M 3/1584
  USPC ........................................................ 323/272
  See application file for complete search history.

(56) References Cited

U.S. PATENT DOCUMENTS

| | | | | |
|---|---|---|---|---|
| 6,813,173 B2* | 11/2004 | Lipcsei | ............................ | 363/98 |
| 7,035,125 B2 | 4/2006 | Yoshida | | |
| 7,109,689 B2* | 9/2006 | Schneider | ...................... | 323/272 |
| 7,646,108 B2* | 1/2010 | Paillet et al. | .................... | 307/11 |
| 7,884,588 B2* | 2/2011 | Adragna et al. | ............... | 323/272 |
| 2009/0103272 A1* | 4/2009 | Watanabe | ...................... | 361/748 |

FOREIGN PATENT DOCUMENTS

JP    2004-260992 A    9/2004

OTHER PUBLICATIONS

Pengfei Li, et al., "A DLL Based Multiphase Hysteretic DC-DC Converter", ISQED (2007), pp. 98.
Kisun Lee, et al., "A Hysteretic Control Method for Multiphase Voltage Regulator", IEEE Power Electronics vol. 24 No. 12 (2009), pp. 2726-2734.
Wei Gu, et al., "A Multiphase DC/DC Converter with Hysteretic Voltage Control and Current Sharing", APEC (2002), pp. 670-674.
Gerhard Schrom et al., "A 480-MHz, Multi-Phase Interleaved Buck DC-DC Converter with Hysteretic Control", IEEE 35th Power Electronics Specialist Conf. (2004), pp. 4702-4707.
J.A. Abu-Qahouq et al., "Multiphase Voltage-Mode Hysteretic Controlled VRM With DSP Control and Novel Current Sharing", APEC (2002), pp. 663-669.
Jian Li, et al., "New Digital Control Architecture Eliminating the Need for High Resolution DPWM", PESC (2007), pp. 814-819.

* cited by examiner

*Primary Examiner* — Harry Behm
(74) *Attorney, Agent, or Firm* — Fish & Richardson P.C.

(57) ABSTRACT

A power supply unit includes first and second sub-power supply module, each having first and second inductor, first and second switching element which switches current supplied from an input power supply to the first and second inductor, first and second drive control circuit which drives the first and second switching element, and first and second sub-output terminal to which current is output from the first and second inductor respectively; and a common output terminal to which the first sub-output terminal and the second sub-output terminal are coupled, wherein an ON operation of the first switching element is controlled depending on whether or not an output voltage of the common output terminal is lower than a first voltage, and an ON operation of the second switching element is controlled depending on whether or not the output voltage is lower than a second voltage, which is different from the first voltage.

5 Claims, 22 Drawing Sheets

POWER SUPPLY UNIT

CROSS-REFERENCE TO RELATED APPLICATION

This application is based upon and claims the benefit of priority of the prior Japanese Patent Application No. 2011-141512, filed on Jun. 27, 2011, the entire contents of which are incorporated herein by reference.

FIELD

The present invention relates to a power supply unit.

BACKGROUND

A power supply unit generates a desired potential of output voltage by boosting or dropping the power supply voltage. The power supply unit is therefore a voltage converter which converts the power supply voltage supplied from the outside into desired voltage.

In the case of a step-down type voltage converter, a switching element coupled to the power supply voltage performs the ON/OFF switching operation according to the potential of the output voltage, and generates output voltage having a desired potential for an output terminal by intermittently outputting current to the output terminal. An inductor is disposed between the switching element and the output terminal, and current smoothed by the inductor is output to the output terminal. A load circuit is coupled to the output terminal, and voltage having a desired potential is output to the load circuit. The potential of the output voltage fluctuates according to the power consumption of the load circuit, and the voltage converter performs the switching operation so as to minimize the fluctuation (ripple).

In the case of a step-up type voltage converter as well, a switching element is disposed between inductor coupled to the power supply voltage and a reference potential, such as a ground, and current is intermittently supplied to the inductor by the ON/OFF switching operation of the switching element, the current is output to the output terminal by electromagnetic energy stored in the inductor, and output voltage having a desired potential, which has been boosted to be higher than the power supply voltage, is generated for the output terminal. In this case as well, a load circuit is coupled to the output terminal, and voltage having a desired potential is supplied to the load circuit. The potential of the output voltage fluctuates according to the power consumption of the load circuit, and the voltage converter performs the switching operation so as to minimize the fluctuation.

The voltage converter has an inductor for smoothing the output current, as mentioned above, and a capacitor for smoothing the output voltage is coupled to the output terminal. A standard voltage converter is a DC-DC converter which converts a DC voltage into another DC voltage.

In such a voltage converter, the inductor and the capacitor are large and expensive, and are normally externally coupled to a power supply chip integrating a switching element and a control circuit for controlling the switching element. In order to provide a sufficient smoothing function, the inductance of the inductor and the capacitance of the capacitor must be large, and for this reason the external dimensions of the conductor and the capacitor are large.

The inductance of the inductor and the capacitance of the capacitor may be decreased by increasing the switching frequency. In order to increase the switching frequency however, a power MOSFET, which operates at high-speed, is necessary for the switching element, and the chip size of such a power MOSFET is large. Furthermore, it is difficult to implement an inductor and a capacitor of which loss is small even when operating at high frequency, and cost thereof is high.

To solve this problem, a multiphase type voltage converter was proposed, where a voltage converter is constituted by a plurality (N) of sub-voltage converters, and these sub-voltage converters perform the switching operation in N phase. If the multiphase type is used, the frequency of each sub-voltage converter may be decreased, and the requirements for the power MOSFET, the inductor and the capacitor may be relaxed. In other words, the size of the power MOSFET may be decreased by decreasing the frequency. Since the voltage converter has a plurality (N) of sub-voltage converters, the overall inductance is set to a demanded value even if the inductance of the inductor of each sub-voltage converter is decreased to 1/N. The following non-patent documents all disclose a multiphase type voltage converter.

[Patent Document 1] Japanese Patent Application Laid-Open No. 2004-260992

[Non-Patent Document 1] "A DLL Based Multiphase Hysteretic DC-DC Converter", P. Li, ISQED, 2007, pp. 98

[Non-Patent Document 2] "A Hysteretic Control Method for Multiphase Voltage Regulator", K. Lee, IEEE Power Electronics, vol. 24, No. 12, (2009), pp. 2726

[Non-Patent Document 3] "A Multiphase DC/DC Converter with Hysteretic Voltage Control and Current Sharing", W. Gu, APEC, 2002, pp. 670

[Non-Patent Document 4] "A 480-MHz Multi-Phase Interleaved Buck DC-DC Converter with Hysteretic Control", G. Schrom, IEEE $35^{th}$ Power Electronics Specialist Conf., (2004), pp. 4702

[Non-Patent Document 5] "Multiphase Voltage-Mode Hysteretic Controlled VRM with DSP Control and Novel Current Sharing", J. A. Abu-Qahouq, APEC, 2002, pp. 663

[Non-Patent Document 6] "New Digital Control Architecture Eliminating the Need for High Resolution DPWM", J. Li, PESC, 2007, pp. 814

The multiphase type voltage converter however, must control the switching of the plurality of sub-voltage converters in N phases, and perform complicated pulse width modulation (PWM) and pulse frequency modulation (PFM), hence the control circuit for controlling the switching becomes complicated and large in terms of circuit scale. Particularly in the case of decreasing the sizes of the inductor and the power MOSFET of an individual sub-voltage converter and making the output capacitor small by increasing the number of sub-voltage converters, a large scale control circuit of each sub-voltage converter causes the overall circuit scale to increase.

SUMMARY

According to one aspect of the embodiment, a power supply unit includes: a first sub-power supply module, comprising a first inductor, a first switching element which switches current supplied from an input power supply to the first inductor, a first drive control circuit which drives the first switching element, and a first sub-output terminal to which current is output from the first inductor; a second sub-power supply module, comprising a second inductor, a second switching element which switches current supplied from an input power supply to the second inductor, a second drive control circuit which drives the second switching element, and a second sub-output terminal to which current is output from the second inductor; and a common output terminal to which the first sub-output terminal and the second sub-output terminal are coupled, wherein an ON operation of the first switching element is controlled depending on whether or not an output voltage of the common output terminal is lower than a first voltage, and an ON operation of the second switching element is controlled depending on whether or not the output voltage is lower than a second voltage, which is different from the first voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

[First Embodiment, Step-Down Type Power Supply Unit]

Figure 1:
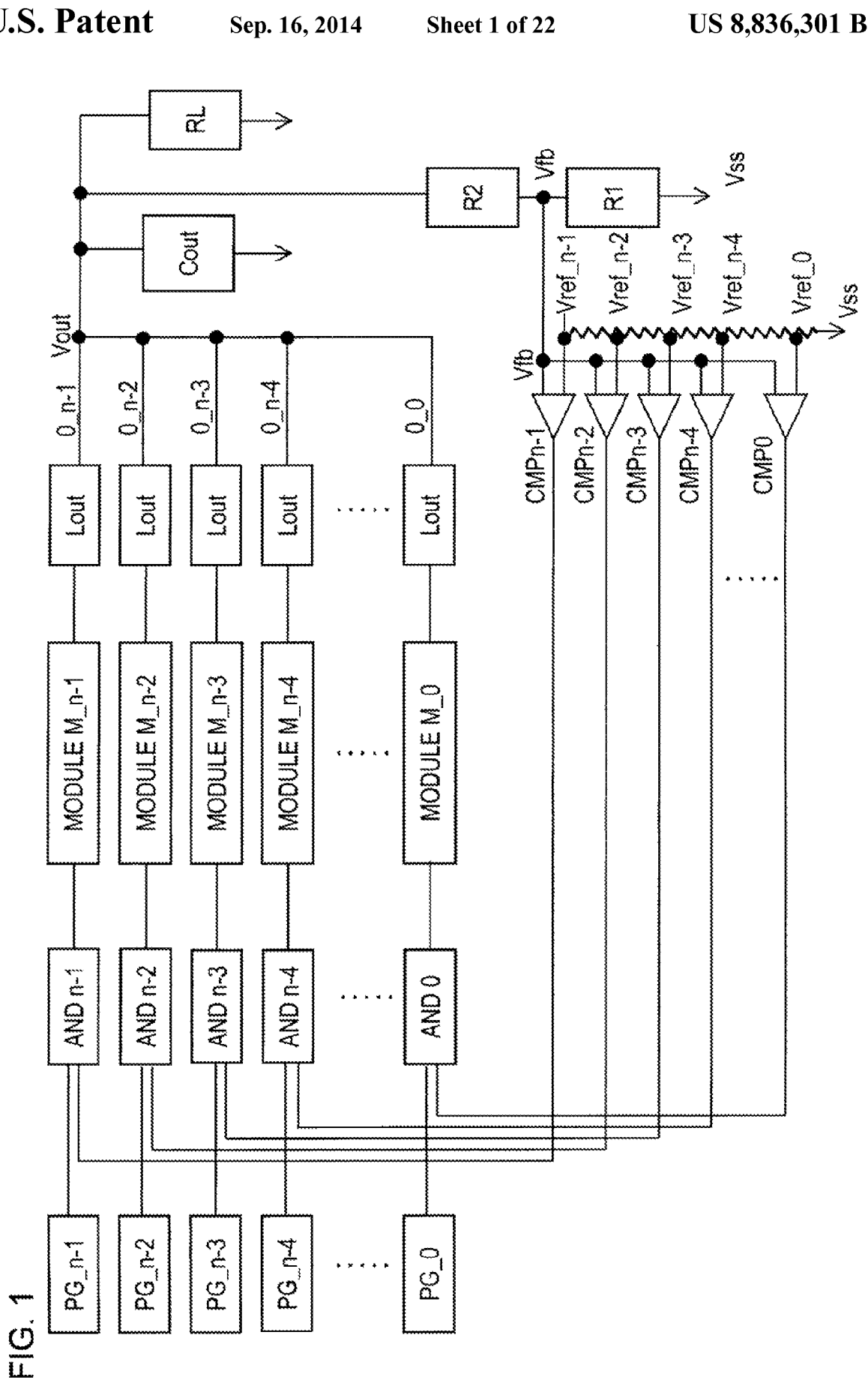
FIG. 1 is a block diagram depicting a power supply unit according to a first embodiment.

FIG. 1 is a block diagram depicting a power supply unit according to a first embodiment. The first embodiment is an example of a step-down type power supply unit. In this power supply unit, sub-output terminals 0_0 to 0_n−1, of n number of sub-power supply modulating in the 0th step to the (n−1)th step, are coupled, and generates a desired output voltage to a common output terminal Vout. Each sub-power supply module has an output inductor Lout, a module circuit M_0 to M_n−1 having a switching element coupled to an input power supply (not illustrated), and a drive circuit AND_0 to AND_n−1 for driving the switching element. As mentioned later, this drive circuit has an AND gate, and a pulse signal from a pulse generation circuit PG_0 to PG_n−1 and a comparison signal from a comparator CMP_0 to CMP_n−1 are input to this AND gate. The pulse generation circuit PG_0 to PG_n−1 generates pulse signals of which phases are preferably shifted from each other. In the case of the example in FIG. 1, there are n number of sub-power supply modules, and the pulse signals generated by the pulse generation circuits have N phases, and as mentioned later, these pulses may overlap with each other.

A smoothing capacitor Cout is coupled to the common output terminal Vout, and a load circuit RL which supplies the generated power is also coupled.

The comparator CMP_0 to CMP_n−1 which corresponds to each sub-power supply module compares feedback voltage Vfb, which is generated by dividing the output voltage of the common output terminal Vout by resistors R1 and R2 between the common output terminal Vout and the ground voltage VSS, and reference voltages Vref_0 to Vref_n−1 that are different from each other, and outputs the comparison result to the drive circuit AND_0 to AND_n−1 respectively as a comparison result signal. If the feedback voltage Vfb is lower than the reference voltage, the comparison result signal becomes H level, and if the pulse signal generated by the pulse generation circuit is H level, the drive circuit controls the switching element in the modulate circuit M_0 to M_n−1 to the ON state respectively. Current according to the duration of the ON state is output to the output terminal O_0 to O_n−1 of each sub-power supply modulate respectively.

The comparator, the pulse generation circuit and the drive circuit constitute a drive control circuit for controlling the driving of the switching element.

Figure 2:
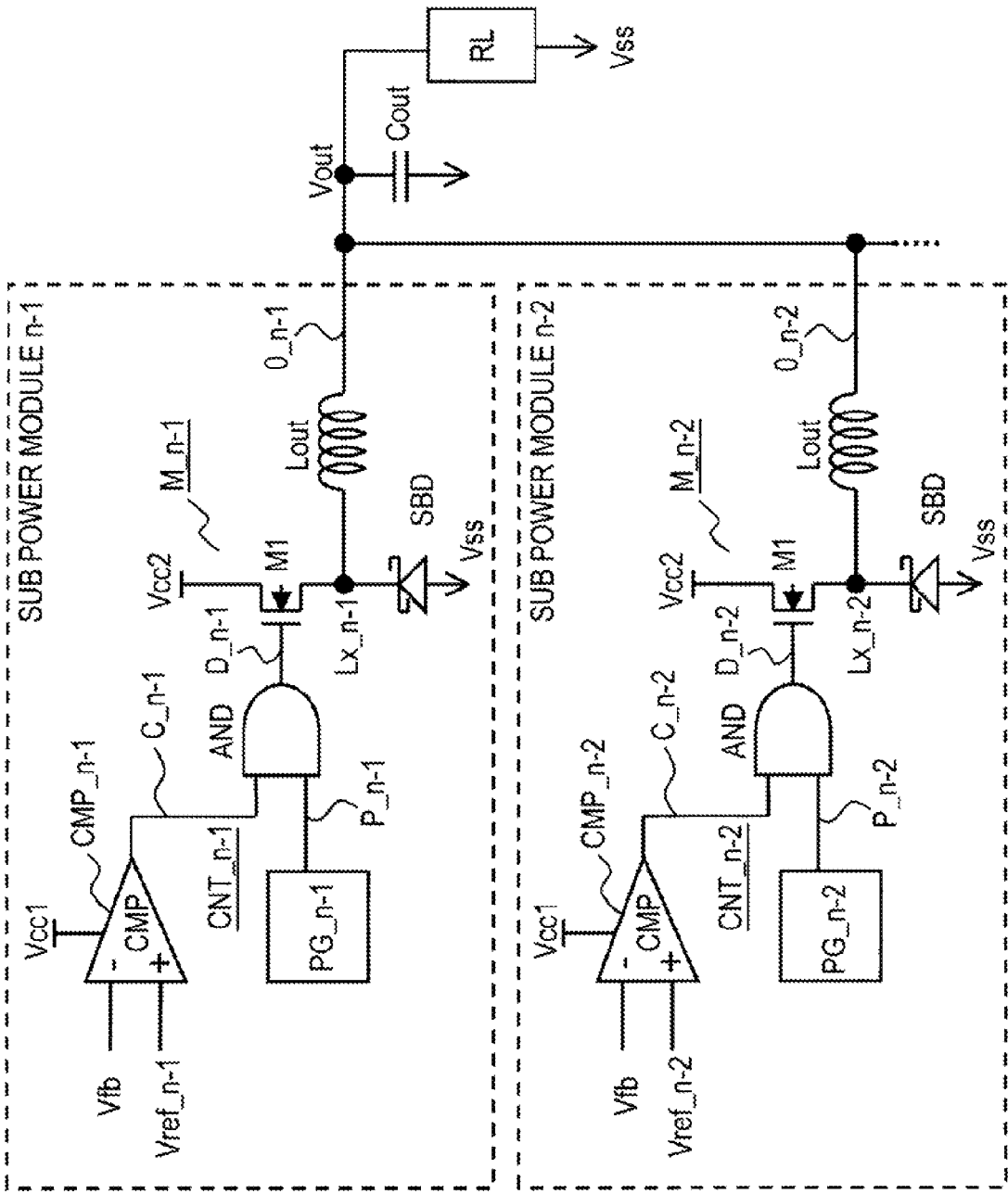
FIG. 2 is a circuit diagram of a sub-power supply module of the step-down type power supply unit in FIG. 1.

FIG. 2 is a circuit diagram of a sub-power supply module of the step-down type power supply unit in FIG. 1. The sub-power supply module in the (n−1)th step has a module circuit M_n−1 including an inductor Lout, a switching element M1 constituted by an N-channel MOS (NMOS) transistor disposed between the power supply Vcc2 and the inductor Lout, and a Schottky Barrier Diode SBD disposed between the ground Vss and the inductor Lout. The switching element M1 and the inductor Lout are coupled via a connection node Lx_n−1. Furthermore, the sub-power supply module in the (n−1)th step also has an AND gate (drive circuit) for supplying a drive pulse to the gate of the switching element Mi, a comparator CMP_n−1 and the pulse generation circuit PG_n−1. The AND gate, the comparator CMP_n−1, and the pulse generation circuit PG_n−1 constitute a drive control circuit CNT_n−1 for driving the switching element M1.

The comparator CMP_n−1 compares the feedback voltage Vfb generated from the output voltage Vout and the (n−1)th reference voltage Vref_n−1, and sets the output C_out to H level if the feedback voltage Vfb is lower than the reference voltage Vref_n−1, and sets the output C_out to L level if the feedback voltage Vfb is higher than the reference voltage Vref_n−1. The pulse generation circuit PG_n−1 outputs a pulse signal P_n−1 having the (n−1)th phase, out of the pulse signals having the $0^{th}$ phase to the (n−1)th phase generated by the n number of sub-power supply modules. Therefore, when the pulse signal P_n−1 is in the H level period, the AND gate passes the comparison result signal C_n−1 of the comparator CMP_n−1, and supplies the drive pulse D_n−1 to the gate of the switching element M1 to turn the switching element M1 ON/OFF.

When the pulse signal P_n−1 is in the H level period, the switching element M1 turns ON, supplies current from the power supply Vcc2 to the inductor Lout, and stores the electromagnetic energy in the inductor Lout if the potential of the output voltage of the common output terminal Vout is lower than the potential corresponding to the reference voltage Vref_n−1. If the potential of the output voltage of the common output terminal Vout is higher than the potential corresponding to the reference voltage Vref_n−1 when the pulse signal P_n−1 is in the H level period, on the other hand, the switching element M1 turns OFF. If the switching element M1 turns OFF, current flows from the ground Vss to the inductor Lout and the output terminal O_n−1 via the Schottky Barrier Diode SBD. Thus when the pulse signal P_n−1 is in the H level period, the inductor Lout smoothes current that is intermittently supplied from the power supply Vcc2 by the ON/OFF operation of the switching element M1, and outputs the smoothed current to the output terminal O_n−1. When the pulse signal P_n−1 is in the L level period, the switching element M1 is not ON/OFF-controlled, but remains OFF.

The sub-power supply module in the (n−2)th step has a configuration similar to the (n−1)th step. The reference voltage Vref_n−2 to be input to the comparator CMP_n−2, however, is lower than the reference voltage Vref_n−1 in the (n−1)th step. The pulse generation circuit PG_n−2 generates a pulse signal P_n−2, which is 1/n cycle-phase-shifted from the pulse signal P_n−1 generated by the pulse generation circuit in the (n−1)th step. The duty ratio of the pulse signal, however, is the same.

Therefore in the (n−2)th sub-power supply mode, when the pulse P_n−2, of which phase is shifted from the pulse P_n−1 of the (n−1)th step, is in the H level period, the switching element M1 turns ON/OFF by the comparison result signal C_n−2, which becomes H level if the feedback voltage Vfb is lower than the reference voltage Vref_n−2, and becomes L level if the feedback voltage Vfb is higher than the reference voltage Vref_n−2. In other words, the switching element module M1 of the sub-power supply module in the (n−2)th step is controlled to be ON or OFF based on the potential of the output voltage Vout which is lower than the sub-power supply module in the (n−1)th step, whereas the switching element M1 of the sub-power supply module in the (n−1)th step is controlled to be ON or OFF based on the potential of the output voltage Vout, which is higher than the sub-power supply module in the (n−2)th step. In other words, if the feedback voltage Vfb which is in proportion to the output voltage Vout is lower than the reference voltage Vref_n−2, both switching elements M1 in the (n−2)th step and the (n−1)th step turn ON, and if the feedback voltage Vfb is Vref_n−2<Vfb<Vref_n−1, then only the switching element M1 in the (n−1)th step turns ON, and if the feedback voltage Vfb is higher than the reference voltage Vref_n−1 (Vref_n−1<Vfb), then the switching element M1 in the (n−1)th step as well as the switching element M1 in the (n−2)th step turn OFF.

The sub-power supply modules in the (n−3)th step to the $0^{th}$ step also have a similar configuration as the sub-power supply modules in the (n−1)th step and the (n−2)th step.

The power supply unit of this embodiment has n steps of sub-power supply modules, and the switching element M1 of the sub-power supply module in each step turns ON or OFF when the pulse signal generated by the respective pulse generation circuit is in the H level period, depending on whether the feedback voltage Vfb is lower or not than the respective reference voltage Vref. Since the switching element M1 turns ON or OFF by a pulse signal based on the comparison result of the comparator CMP, the output voltage Vout pulsates vertically from the reference voltage group Vref_0 to Vref_n−1. If the output voltage Vout increases in the reference voltage group Vref_0 to Vref_n−1 in the direction from the lower potential to the higher potential, the state where the switching elements M1 are ON in all of the n steps of the sub-power supply modules changes such that the switching elements M1 are sequentially turned OFF from the $0^{th}$ step side, and the number of switching elements M1 which are ON decreases. If the output voltage Vout decreases in the reference voltage group Vref_0 to Vref_n−1 from the higher potential to the lower potential, on the other hand, the state where the switching elements M1 are OFF in all the n steps of the sub-power supply modules changes such that the switching elements M1 are sequentially turned ON from the (n−1)th step side, and the number of switching elements M1 which are ON increases. Since the potential of the output voltage Vout at which the switching element M1 turns ON is different in each step, the ON period is different, and the ON duty thereof is also different depending on the step.

Thus the switching element of the sub-power supply module in each step turns ON or OFF based on a different reference voltage Vref, therefore the pulsation of the output voltage Vout is small and the ripple thereof is also small, compared with the case of the switching elements of all the sub-power supply modules turning ON or OFF based on the same reference voltage Vref. In other words, in the case of the switching elements of all the sub-power supply modules turning ON or OFF based on the same reference voltage Vref, the switching elements M1 in all the sub-power supply modules turn ON or OFF at the same time, hence the total amount of current which is supplied to the inductor Lout is high, and the ripple of the output voltage Vout becomes very high.

In the case of this embodiment, if the output voltage Vout is lower than the reference voltage group, the output voltage Vout is stepped up by turning many switching elements M1 ON and supplying current to the inductors Lout, and as the output voltage Vout increases, the number of switching elements M1 which are ON decreases, the current amount supplied to the inductors Lout decreases, and the step-up speed of the output voltage Vout slows down, then if the output voltage Vout becomes higher than all of the reference voltage group, then all the switching elements M1 turn OFF, step-up of the output voltage Vout stops, and the voltage starts to step-down. As the output voltage Vout steps down, the number of switching elements M1 which are ON increases, the current amount supplied to the inductors Lout increases, and the step-down speed of the output voltage Vout slows downs, then if the output voltage Vout becomes lower than all of the reference voltage group, all the switching elements M1 turn ON, step-down of the output voltage Vout stops, and the voltage starts to step-up.

Figure 3:
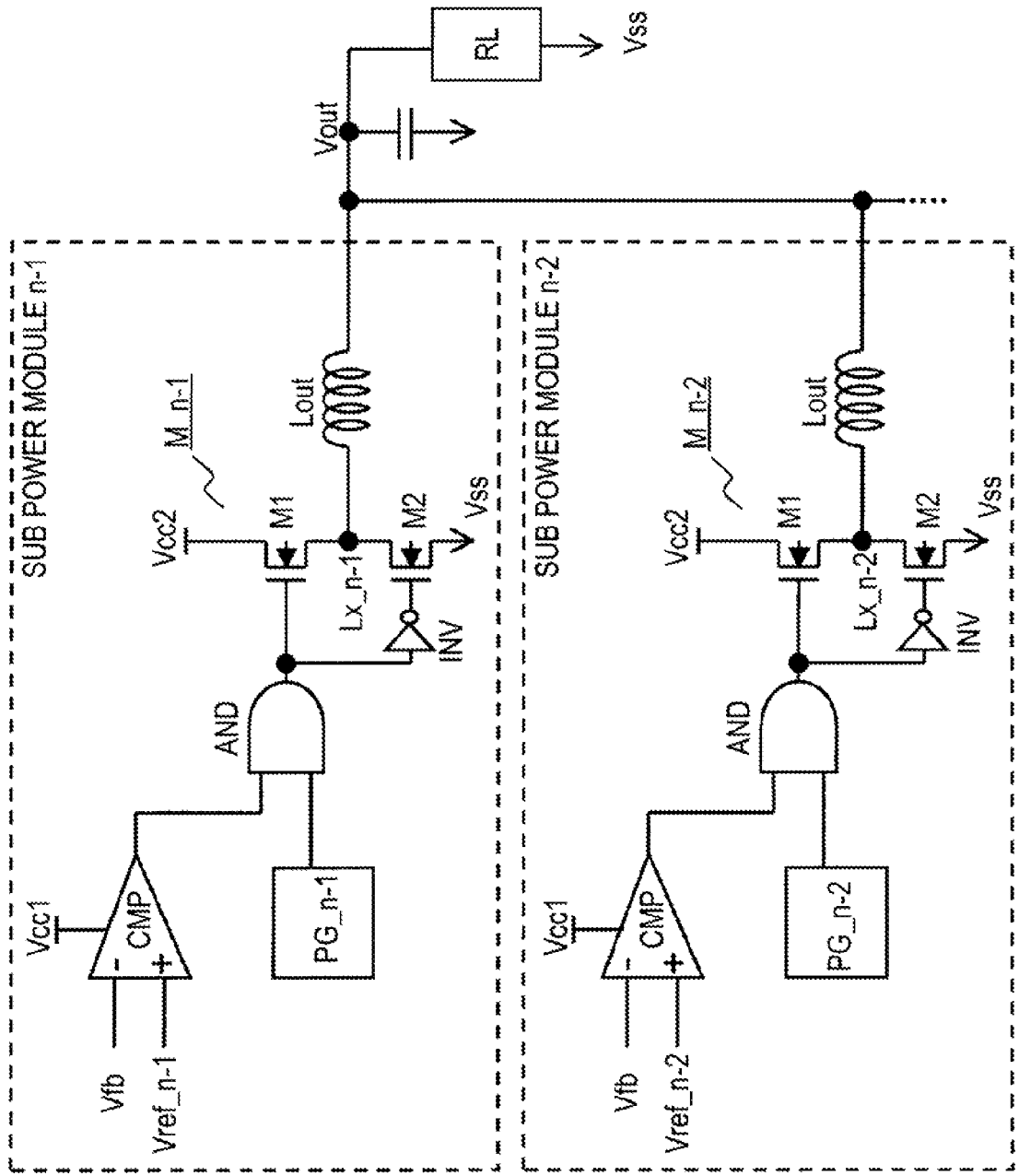
FIG. 3 illustrates a variant form of the sub-power supply module in FIG. 2.

FIG. 3 illustrates a variant form of the sub-power supply module in FIG. 2. In the sub-power supply module in FIG. 3, each of the module circuits M_n−1 and M_n−2 has a first switching element M1 and a second switching element M2. In other words, the second switching element M2 is disposed instead of the Schottky Barrier Diode SBD in FIG. 2. These switching elements M1 and M2 are both NMOS transistors, hence the output signal of the AND gate is directly supplied as a drive pulse to the first switching element Ml, and to the second switching element M2 via the inverter INV. The rest of the configuration is the same as FIG. 2.

In FIG. 3, the first switching element M1 may be constituted by a PMOS transistor and the second switching element M2 may be constituted by an NMOS transistor. In this case, the same drive pulse is supplied to both of these transistors.

The step-down type power supply unit in FIG. 1 has n number of sub-power supply modules, therefore the inductance of the inductor Lout of each sub-power supply module is 1/n compared with the case of using a single power supply module. In other words, the inductance of the inductor Lout of each sub-power supply module is smaller, 1/n, and the size of the inductor Lout is also smaller, 1/n, accordingly. As the inductance becomes smaller, the inductor operates at a higher frequency. Generally the threshold frequency becomes higher as the inductance becomes smaller.

The frequency at each sub-power supply module also becomes lower, hence the size of the power MOSFET constituting the switching element M1 may be decreased accordingly. If the size is decreased, the gate-source capacity decreases, and operation at a higher frequency becomes possible.

As a result, in this multi-power supply module configuration, the overall size may be decreased even if the number of elements increases, compared with a single power supply module. Furthermore if inductance is small, the response speed with respect to the output voltage may be increased.

Most of the drive control circuit for controlling the switching element M1 is comprised of the pulse generation circuit PG, the comparator CMP and the AND gate, and is not so complicated as a conventional PWM control circuit, therefore the overall circuit scale does not become large, even if the multi-power supply module configuration is used.

It is preferable that the plurality of sub-power supply modules illustrated in FIG. 1, FIG. 2 and FIG. 3 are formed within a single semiconductor chip. The inductance of the inductor Lout of each sub-power supply module is small, hence it is preferable that the plurality of the sub-power supply modules, including these inductors, are formed on a single semiconductor chip. The inductor Lout of each sub-power supply module, however, may be coupled as an external component, and the sub-power supply modules, other than the inductors Lout, may be formed on a single semiconductor chip. The capacitance of the smoothing capacitor Cout coupled to the common output terminal Vout may be decreased since the ripple of the output voltage is smaller. Therefore the smoothing capacitor Cout may be formed on a same semiconductor chip of the plurality of sub-power supply modules, or may be coupled as an external component.

Figure 10:
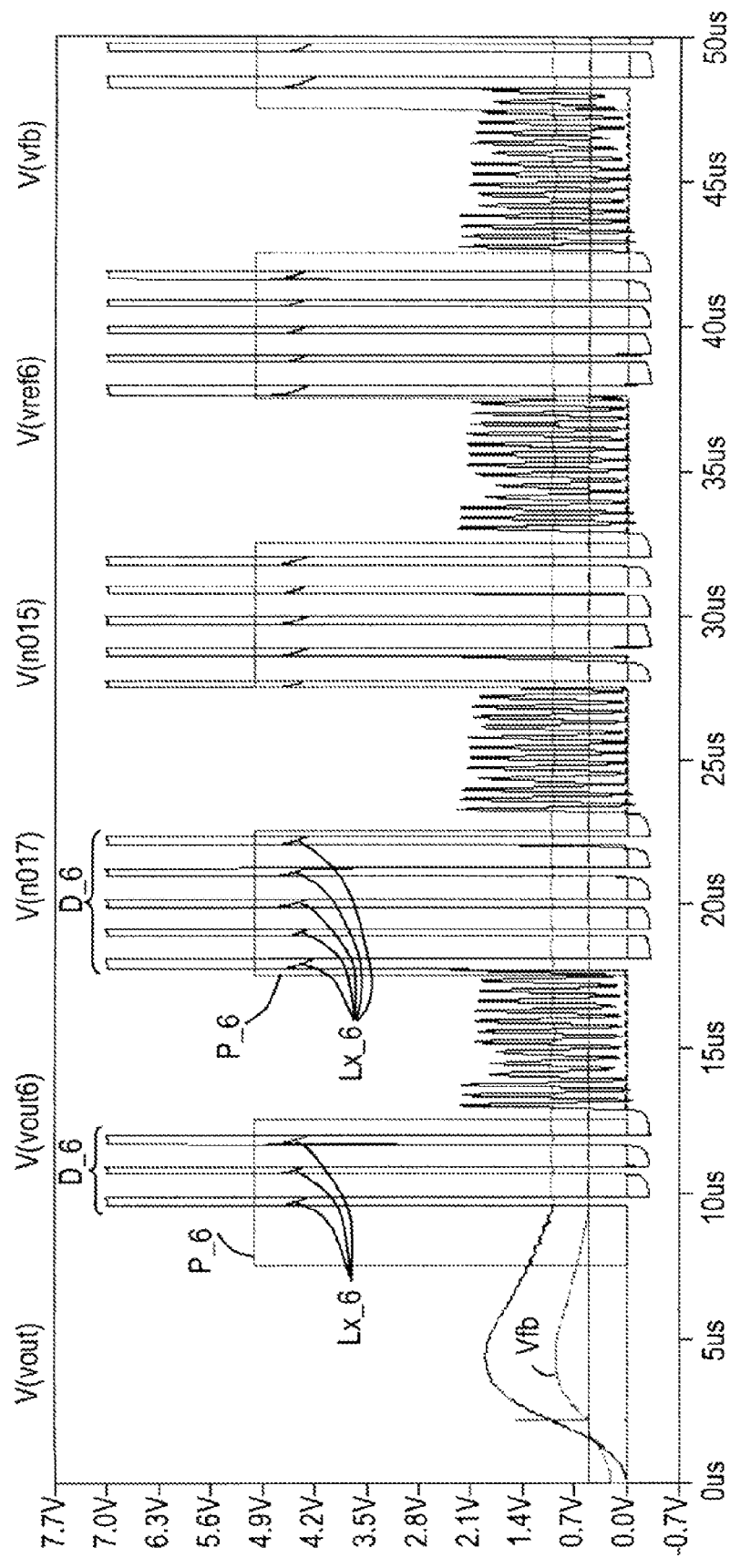
FIG. 10 is a diagram depicting the waveforms of 6th step sub-power supply module of a power supply unit, which has an eight-step sub-power supply module.
Figure 11:
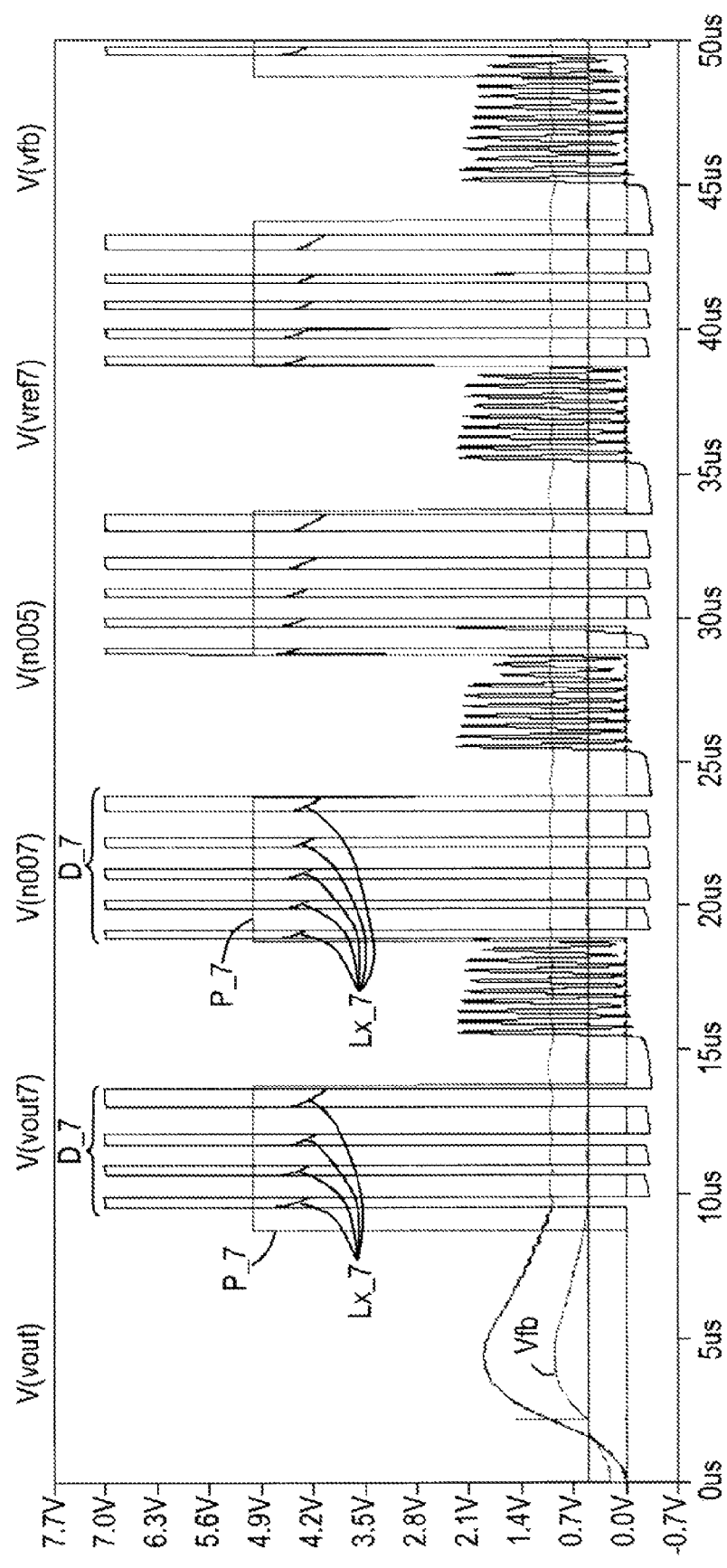
FIG. 11 is a diagram depicting the waveforms of 7th step sub-power supply module of a power supply unit, which has an eight-step sub-power supply module.
Figure 12:
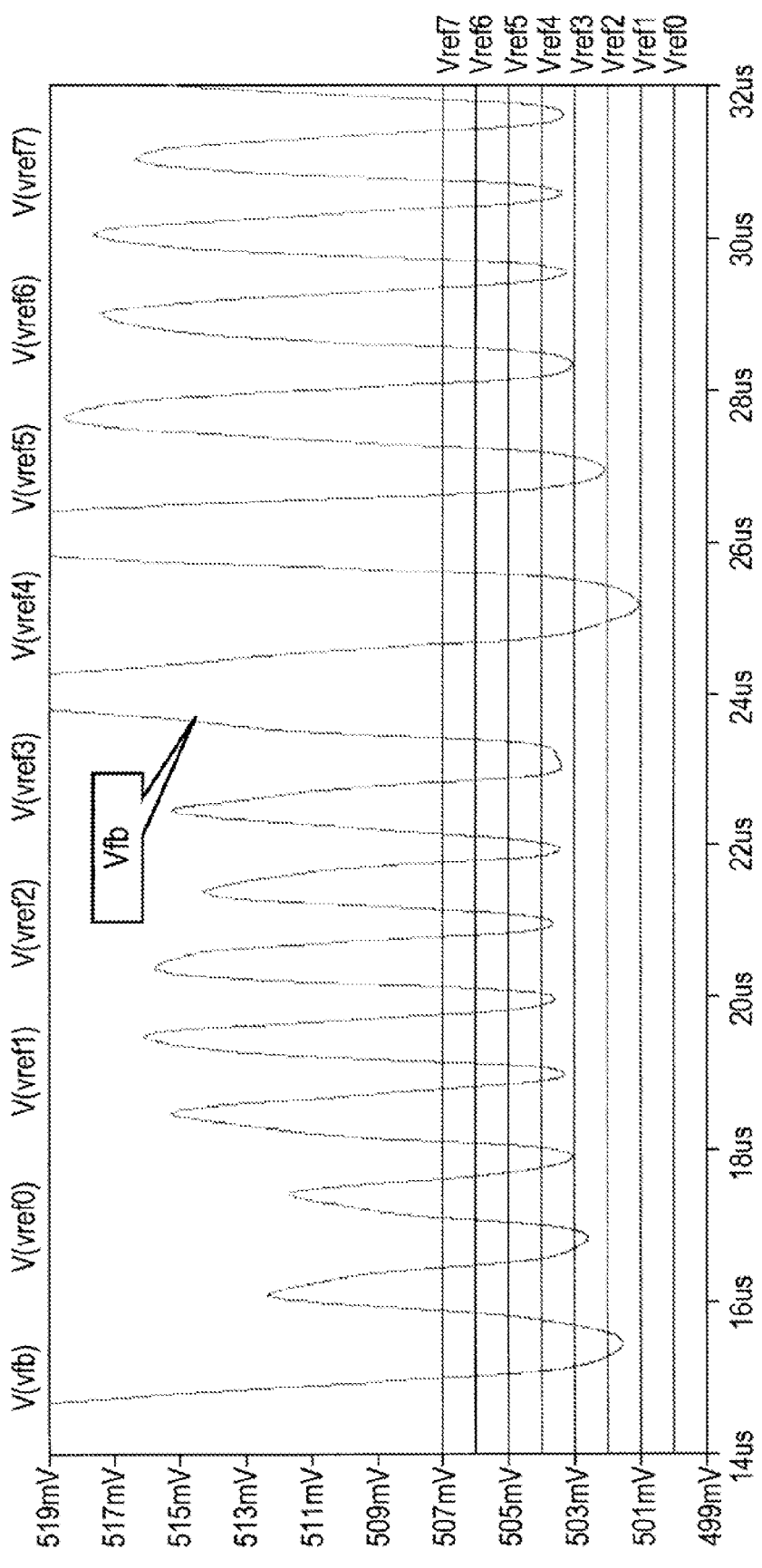
FIG. 12 is a diagram depicting the waveforms of a feedback voltage Vfb with respect to seven reference voltages, Vref_0 to Vref_n−1, of the power supply unit.

FIG. 4 to FIG. 11 are diagrams depicting the waveforms of each sub-power supply module of a power supply unit, which has an eight-step sub-power supply module. Operation waveforms from power ON at time 0 μs until operation becomes relatively stable are depicted. FIG. 12 is a diagram depicting the waveforms of a feedback voltage Vfb with respect to seven reference voltages, Vref_0 to Vref_n−1, of the power supply unit. The waveforms in FIG. 12 are the waveforms from time 14 μs to 32 μs in FIG. 4 to FIG. 11. As depicted here, the feedback voltage Vfb is pulsated vertically up and down from the reference voltage group.

As FIG. 4 to FIG. 11 depict, the output pulses P_0 to P_n−1 of the pulse generation circuit of each sub-power supply module overlap with each other, where the phases thereof are shifted by 1/n of the pulse cycle respectively. When the output pulse is in the H level period, each drive pulse D_0 to D_n−1 to be supplied to the gate of the switching element M1 is generated corresponding to the comparison result signal C of the comparator CMP. The switching element M1 turns ON when each drive pulse D_0 to D_n−1 is in the H level, and turns OFF when each drive pulse D_0 to D_n−1 is in the L level, and corresponding to the ON or OFF operation, the potential of each connection node Lx_0 to Lx_n−1 between the switching element M1 and the inductor Lout moves vertically between the power supply voltage Vcc2 and the negative voltage. The feedback voltage Vfb pulsates vertically, as depicted in the enlarged diagram in FIG. 12.

Figure 4:
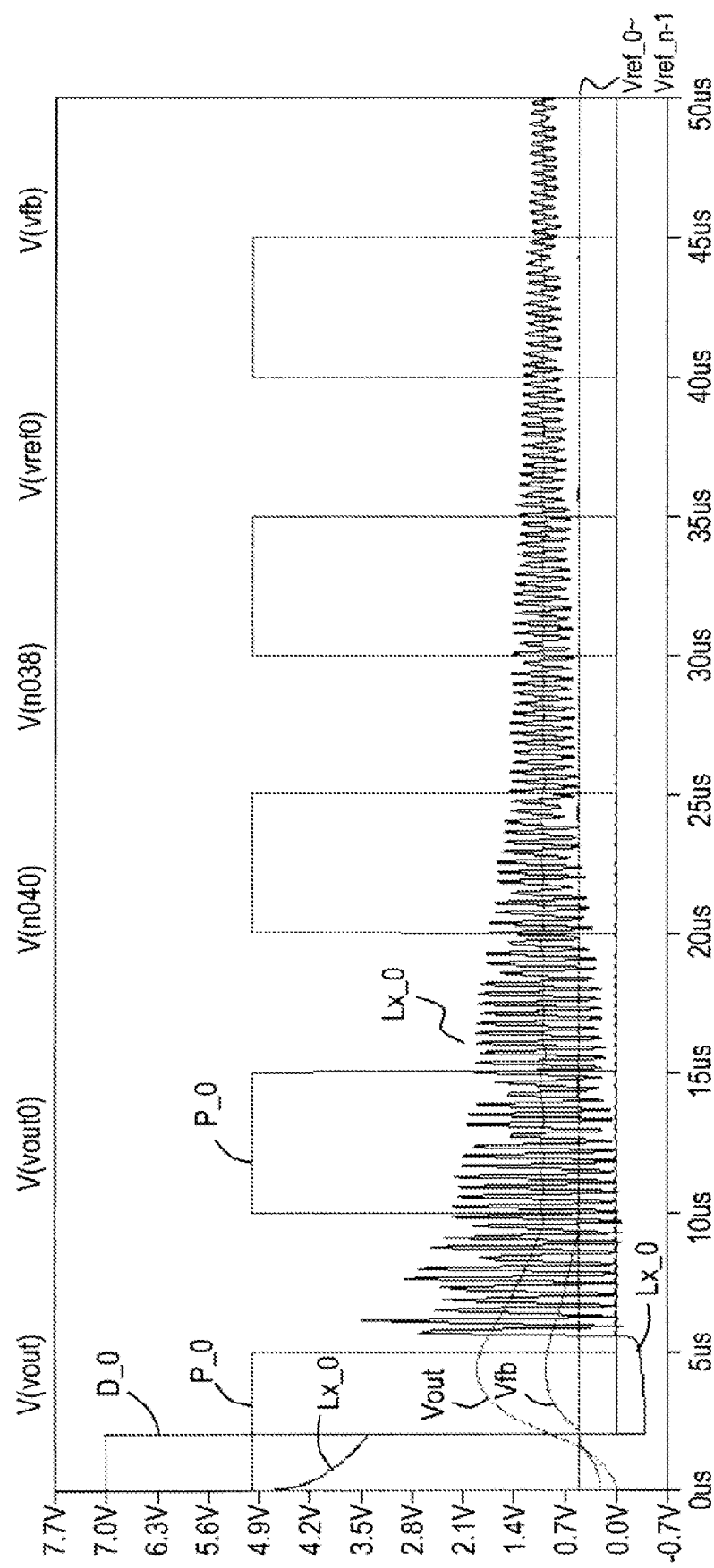
FIG. 4 is a diagram depicting the waveforms of 0th step sub-power supply module of a power supply unit, which has an eight-step sub-power supply module.

In the operation of the sub-power supply module in the $0^{th}$ step in FIG. 4, the feedback voltage Vfb is still 0 V immediately after the start of operation at time 0, hence the comparison result signal C_0 of the comparator CMP_0 becomes H level. On the other hand, the pulse generation circuit PG_0 sets the pulse P_0 to H level first. Therefore the drive pulse D_0 of the output of the AND gate becomes H level, the switching element M1 turns ON, and the connection node Lx_0 becomes H level. At this time, current is supplied from the power supply Vcc2 to the inductor Lout at the output side, and this current is output from the sub-output terminal 0_0 to the common output Vout, and the electromagnetic energy is stored in the inductor. Thereby the output voltage Vout and the feedback voltage Vfb rise.

If the feedback voltage Vfb exceeds the reference voltage Vref_0, the comparison result signal C_0 of the comparator CMP_0 becomes L level, the drive pulse D_0 also becomes L level, and the switching element M1 turns OFF. Thereby the connection node Lx_0 drops from the ground Vss by the amount of the forward voltage of the Schottky Barrier Diode SBD.

When the pulse P_0 becomes L level, the drive pulse D_0 becomes L level, but in the subsequent period where the pulse P_0 is in H level, the feedback voltage Vfb does not become lower than the reference voltage Vref_0 because of the rise of the output voltage Vout, and the drive pulse D_0 is not generated. In other words, after the switching element M1 turns ON at the first drive pulse D_0, the sub-power supply module in the $0^{th}$ step does not perform the ON/OFF operation. The vertical vibration of the connection node Lx_0 is depicted in FIG. 4.

Figure 5:
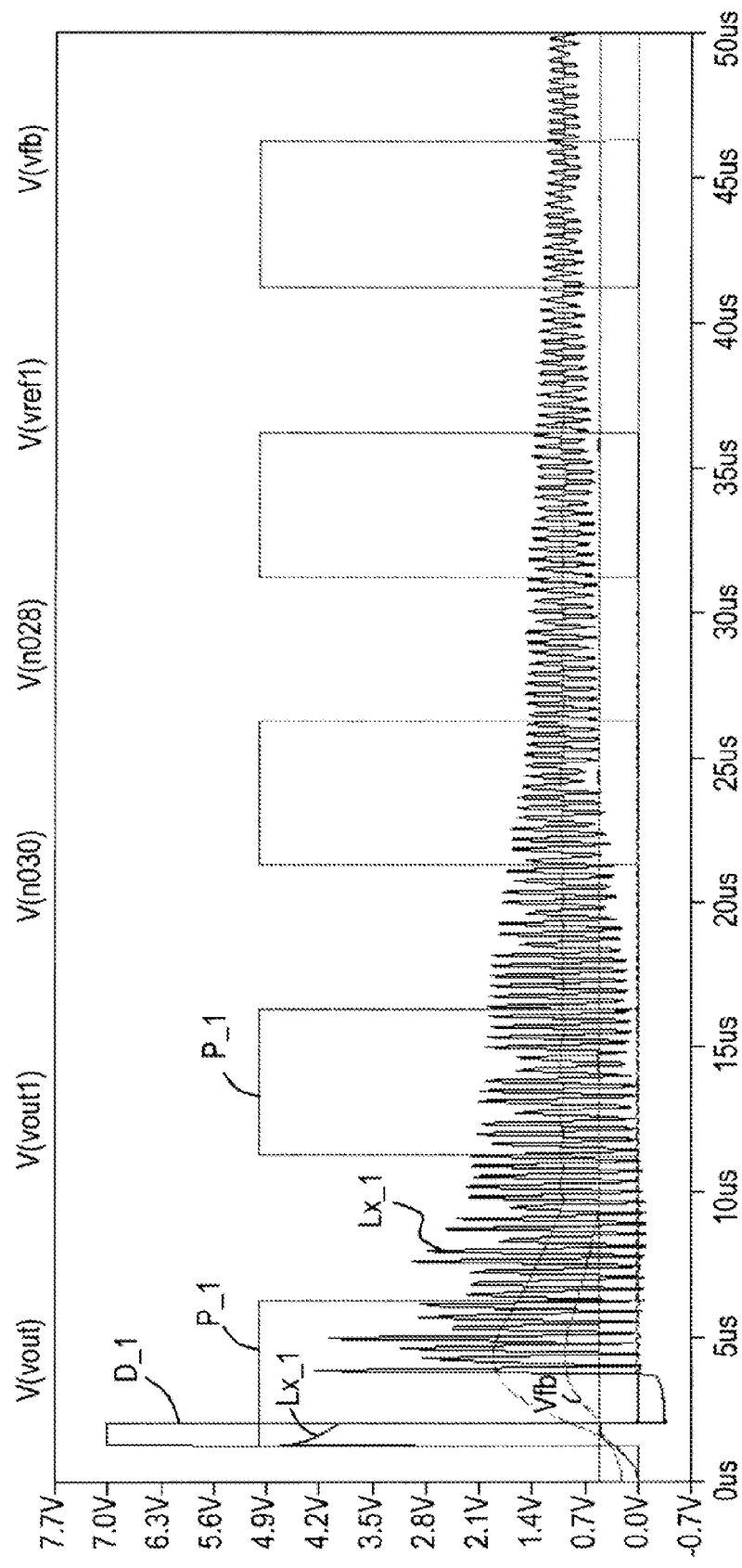
FIG. 5 is a diagram depicting the waveforms of 1st step sub-power supply module of a power supply unit, which has an eight-step sub-power supply module.

In the operation of the sub-power supply module in the first step depicted in FIG. 5, the drive pulse D_1 becomes H level, and the switching element M1 turns ON when the pulse P_1 is in the first H level period after the start of the operation at time 0, and thereafter the drive pulse D_1 is not generated.

Figure 6:
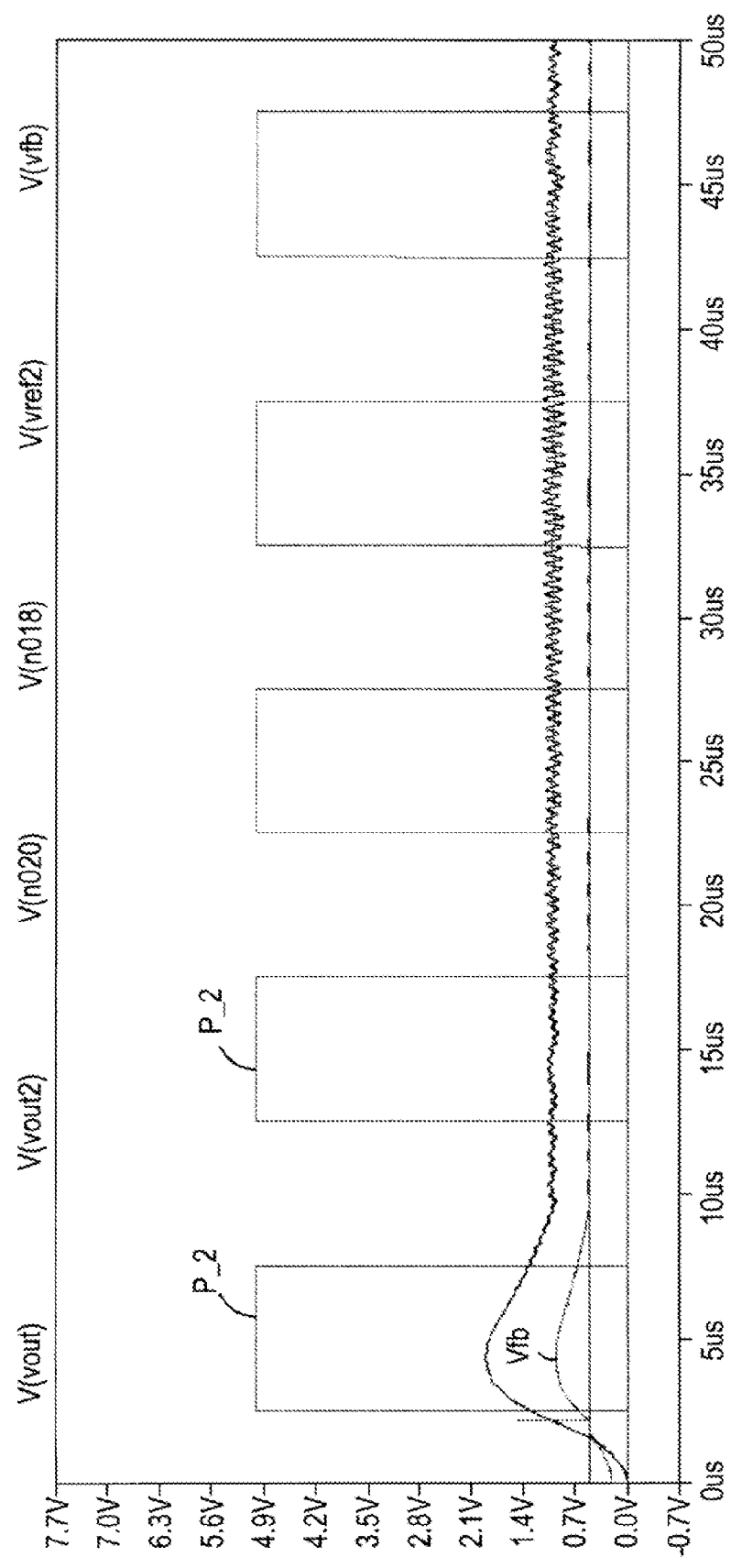
FIG. 6 is a diagram depicting the waveforms of 2nd step sub-power supply module of a power supply unit, which has an eight-step sub-power supply module.

In the operation of the sub-power supply module in the second step depicted in FIG. 6, the drive pulse D_2 is not generated at all. In other words, the sub-power supply module in the second step does not perform the ON/OFF operation at all.

Figure 7:
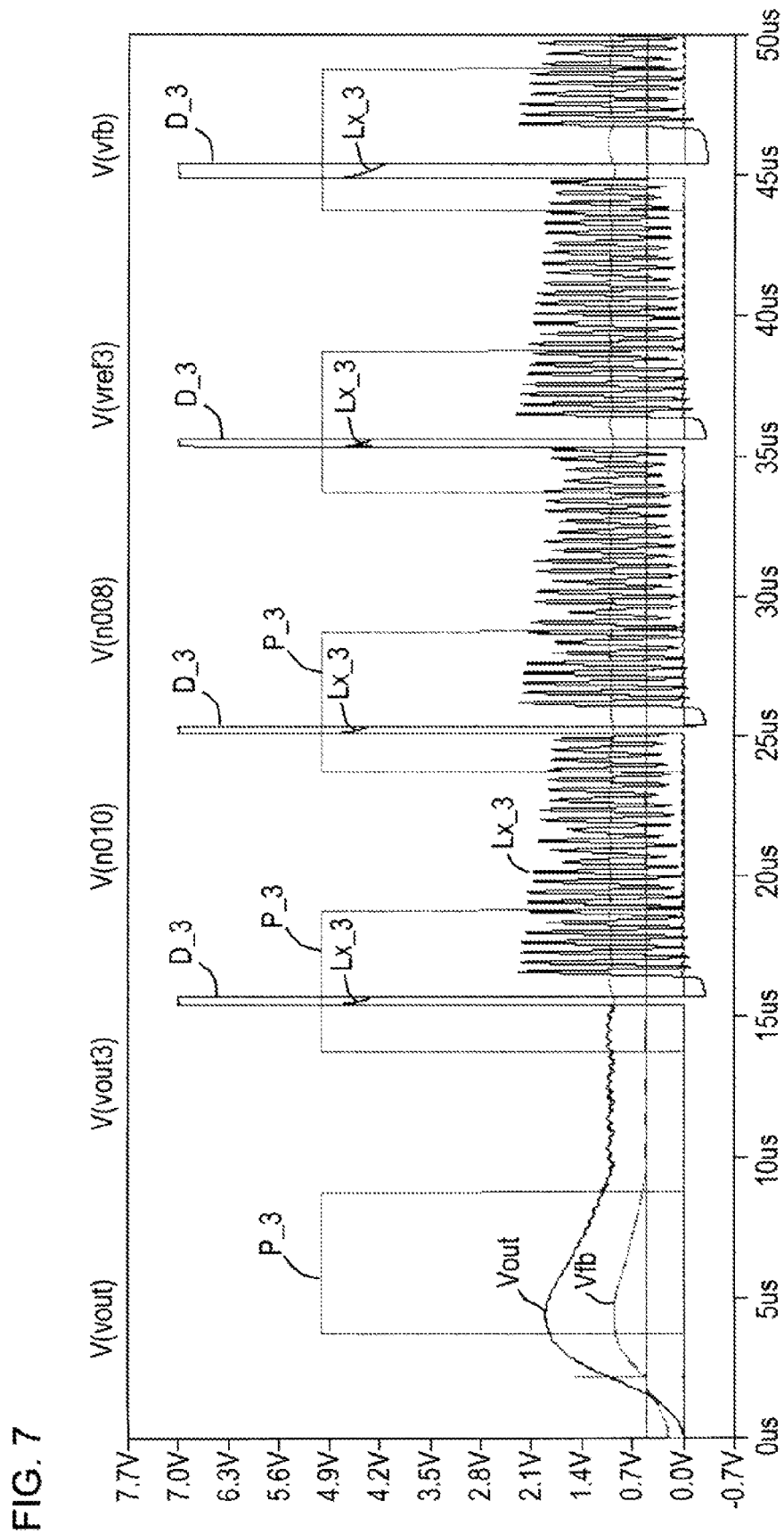
FIG. 7 is a diagram depicting the waveforms of 3rd step sub-power supply module of a power supply unit, which has an eight-step sub-power supply module.

In the operation of the sub-power supply module in the third step depicted in FIG. 7, the drive pulse D_3 is generated only once when the pulse P_3 is in the second and later H level periods respectively. In other words, in the sub-power supply module in the third step, when the pulse P_3 is in the H level period, the switching element M1 is turned ON once, and supplies current to the output terminal Vout, thereby the output voltage Vout rises every time, the feedback voltage Vfb exceeds the reference voltage Vref_3, and the comparison result signal C_3 of the comparator CMP_3 does not becomes H level.

Figure 8:
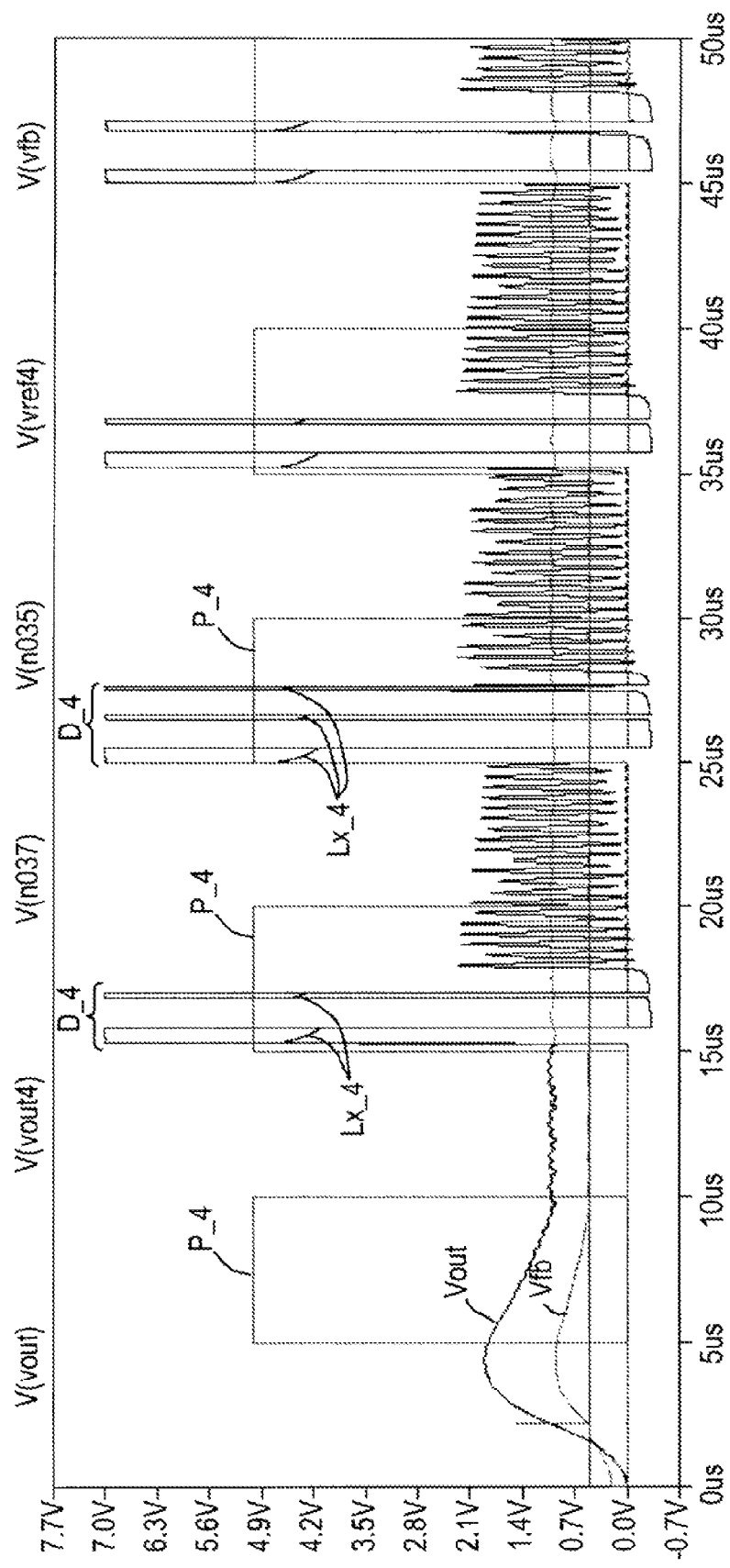
FIG. 8 is a diagram depicting the waveforms of 4th step sub-power supply module of a power supply unit, which has an eight-step sub-power supply module.

In the operation of the sub-power supply module in the fourth step depicted in FIG. 8, the drive pulse D_4 in the H level is generated twice, three times, twice and twice when the pulse P_3 is in the second and later H level periods respectively. In other words, in the sub-power supply module in the fourth step, the reference voltage Vref_4 is higher than the reference voltage Vref_3 of the sub-power supply module in the third step, therefore the drive pulse D_4 is generated a higher number of times, turns the switching element M1 ON, and supplies more current to the output terminal O_4.

Figure 9:
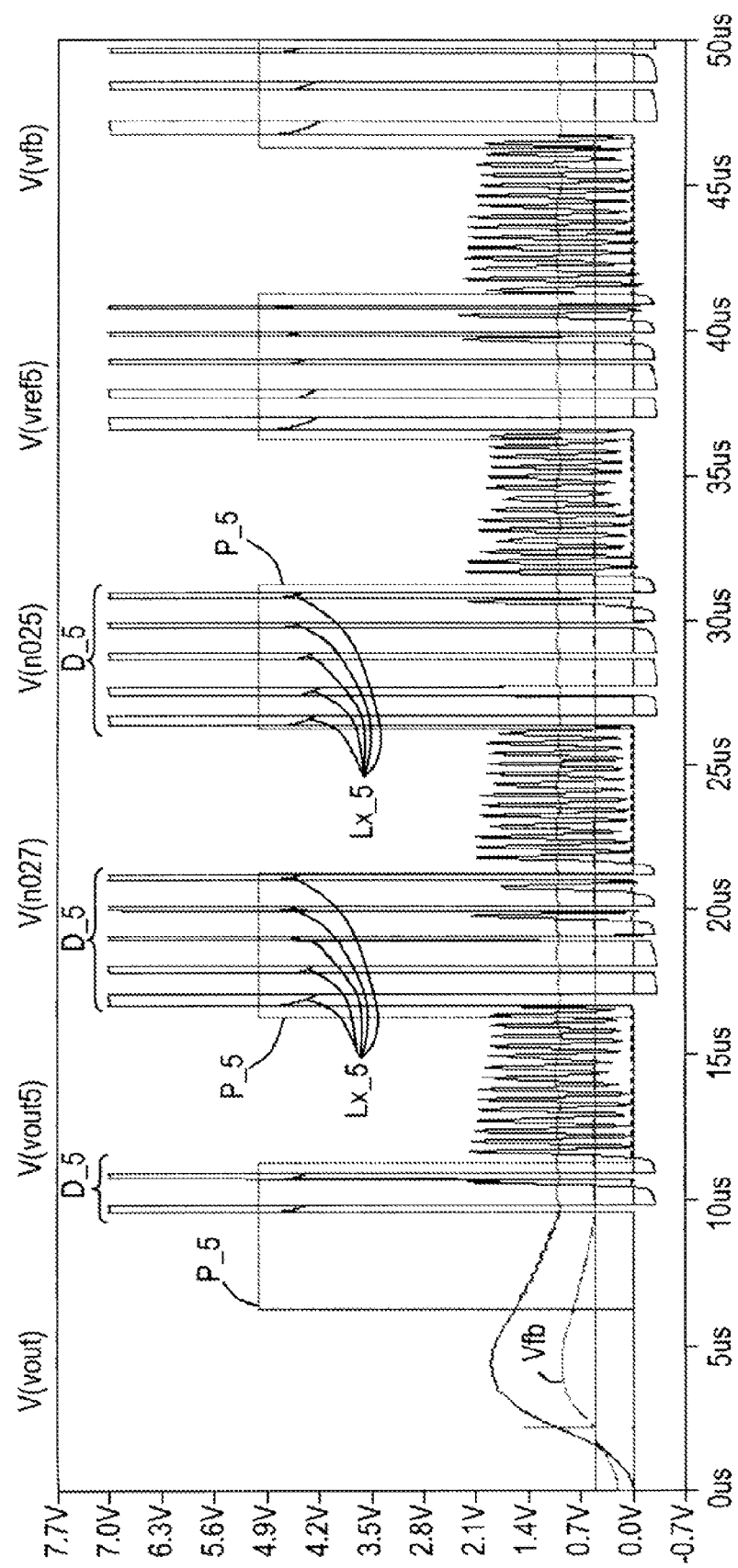
FIG. 9 is a diagram depicting the waveforms of 5th step sub-power supply module of a power supply unit, which has an eight-step sub-power supply module.

In the operation of the sub-power supply module in the fifth step depicted in FIG. 9, the drive pulse D_5 is generated twice, five times, five times and five times when the pulse P_3 is in the first and later H level periods respectively. In other words, in the sub-power supply module in the fifth step, the switching element M1 turns ON a higher number of times than the sub-power supply module in the fourth step, and more current is supplied to the output terminal O_5.

In the operation of the sub-power supply module in the sixth step depicted in FIG. 10, the drive pulse D_6 is generated three times, five times, five times and five times when the pulse P_3 is in the first and later H level periods respectively. The pulse width of each drive pulse D_6 is wider than that of the sub-power supply module in the fifth step. In other words, in the sub-power supply module in the sixth step, the switching element M1 turns ON a higher number of times and is on for a longer duration than the sub-power supply module in the fifth step, so that more current is supplied to the output terminal O_6.

In the operation of the sub-power supply module in the seventh step, which is the highest step, depicted in FIG. 11, the drive pulse D_7 is generated four times, five times, five times and five times when the pulse P_3 is in the first and later H level periods respectively. The pulse width of each drive pulse D_7 is higher than that of the sub-power supply module in the sixth step. In other words, in the sub-power supply module in the seventh step, the switching element M1 turns ON the highest number of times, and is ON for a longest duration in the seven sub-power supply modules, so that most current is supplied to the output terminal O_7.

As FIG. 12 depicts, the feedback voltage Vfb repeats ascending and descending from the reference voltage group Vref_0 to Vref_7. Therefore as described in FIG. 4 to FIG. 11, the number of times, when the drive pulse D_0 to D_7 is generated in each sub-power supply module is lower and the H level pulse width is shorter as the reference voltage Vref becomes lower, and the number of times when the drive pulse D_0 to D_7 is generated in each sub-power supply module is higher, and the H level pulse width is wider as the reference voltage Vref becomes higher. In other words, the ratio of the ON period of the switching element M1 (ON duty ratio) is changed by changing the reference voltage Vref depending on the sub-power supply module.

Figure 13:
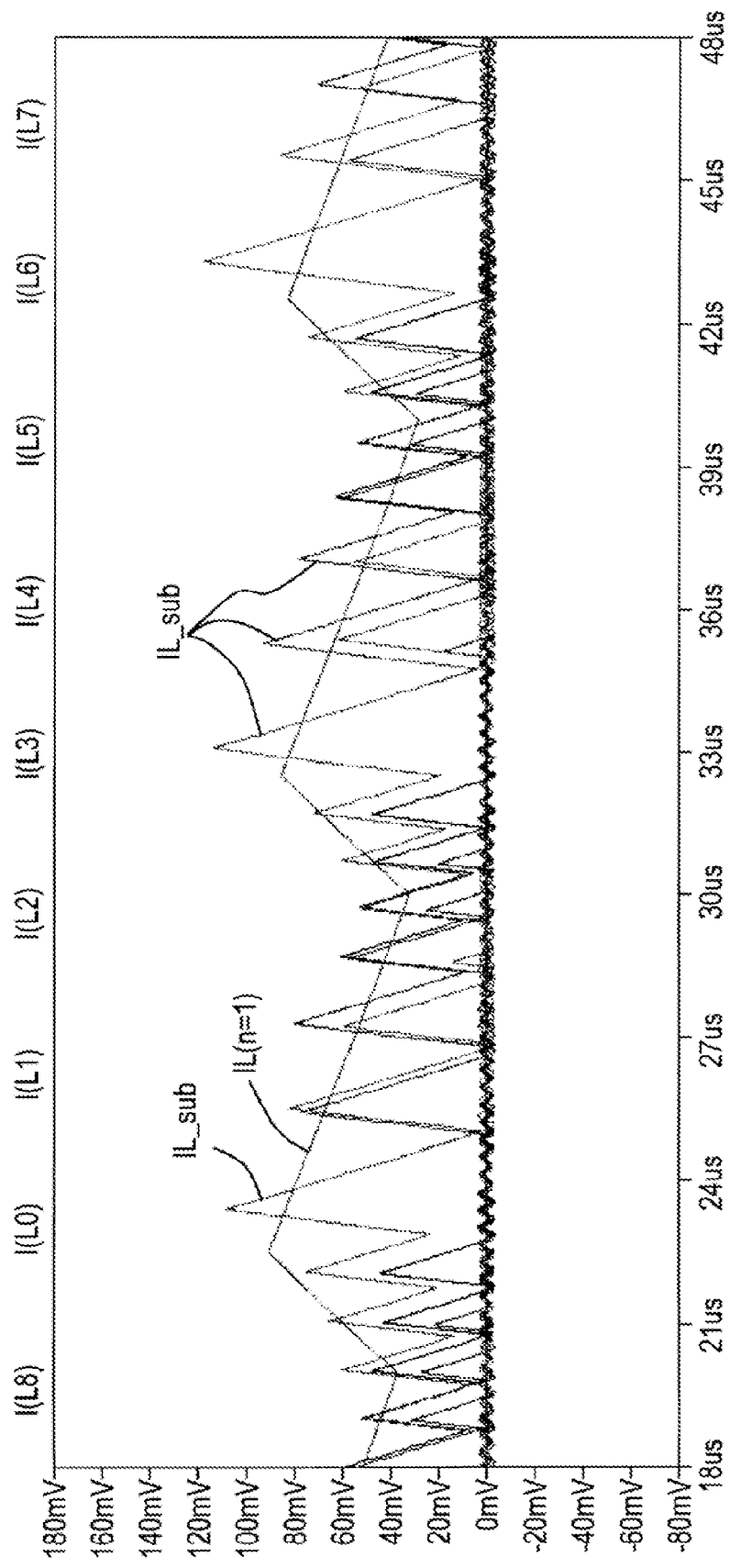
FIG. 13 depicts the ripple current which flows into the output terminal in the example of the eight-step sub-power supply module.

FIG. 13 depicts the ripple current which flows into the output terminal in the example of the eight-step sub-power supply module. In FIG. 13, IL_sub indicates the output current in each sub-power supply module. Since the ON operation of the switching element M1 of each sub-power supply module is different, the output current of each sub-power supply module is different from each other. IL_(n=1), on the other hand, is the output current of a single power supply module.

In the case of a single power supply module, the inductance of the inductor Lout is high, such as 160 µHe. Therefore the cycle of ripple of the output current is long. Whereas according to the present embodiment where eight-step sub-power supply modules are coupled in parallel, the fluctuation width of each output current is approximately the same as that of a single power supply module, but the inductance of the inductor Lout of each sub-power supply module is ⅛ that of the single power supply module, which is 20 µHe, so the cycle of the ripple of the output current becomes short. Furthermore in the eight-step sub-power supply module, the ON/OFF operation periods are shifted by the eight-phase pulses P_0 to P_7. Therefore the fluctuation width of the output voltage Vout would be smaller than that of the single power supply module.

Figure 14:
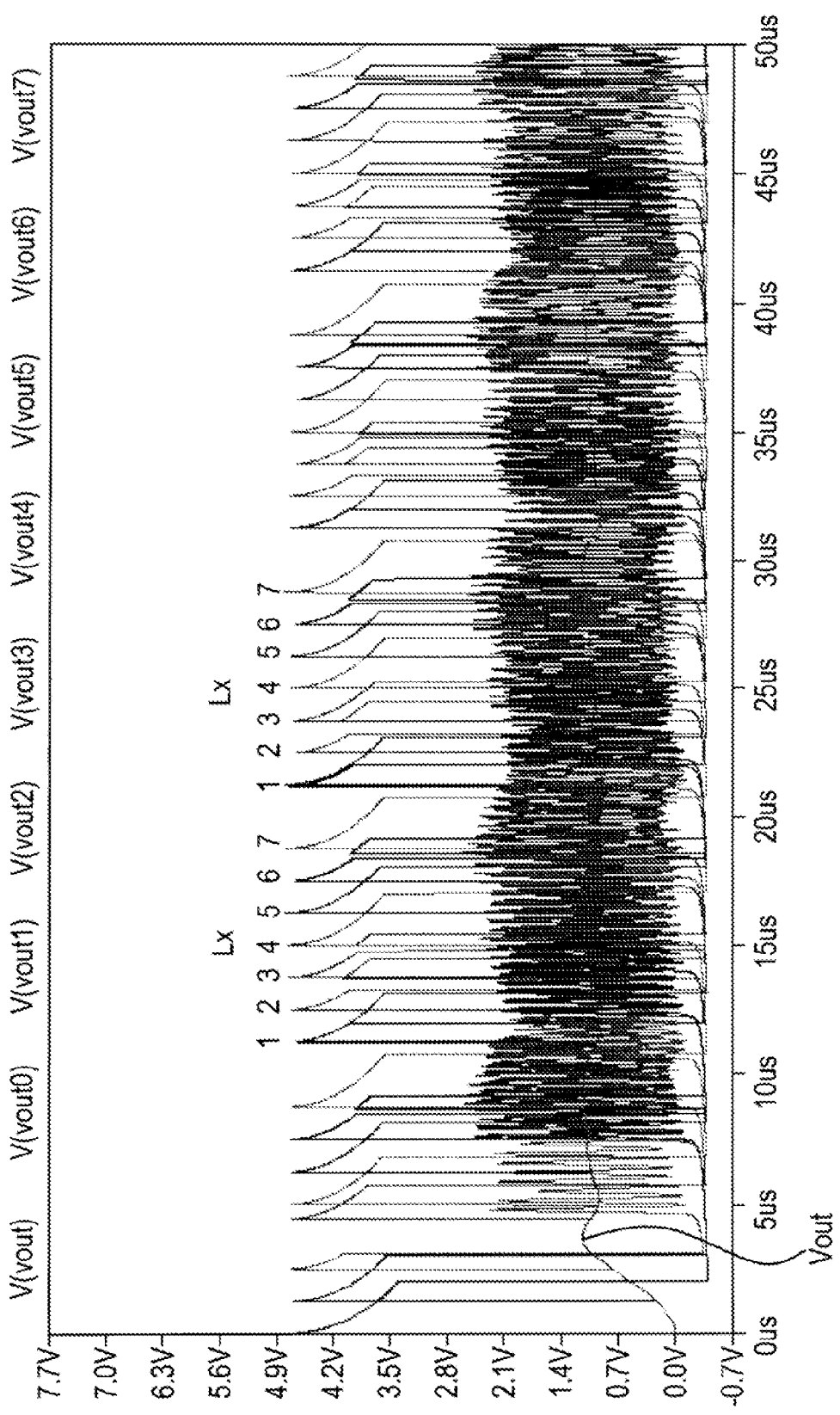
FIG. 14 is a waveform diagram of the connection nodes Lx of the eight-step sub-power supply module and the output voltages Vout when the load of the load circuit is at the intermediate level.

FIG. 14 is a waveform diagram of the connection nodes Lx of the eight-step sub-power supply module and the output voltages Vout when the load of the load circuit is at the intermediate level. This is an example where load is heavier than the examples in FIG. 4 to FIG. 11. Vertical fluctuation of the connection node Lx indicates that the switching element M1 is performing the ON/OFF operation. In the case of the example in FIG. 14, the connection nodes Lx_1 to Lx_7 vertically fluctuate in the sub-power supply modules in the first step to seventh step, but the connection node Lx_0 of the sub-power supply module in the $0^{th}$ step does not fluctuate.

Figure 15:
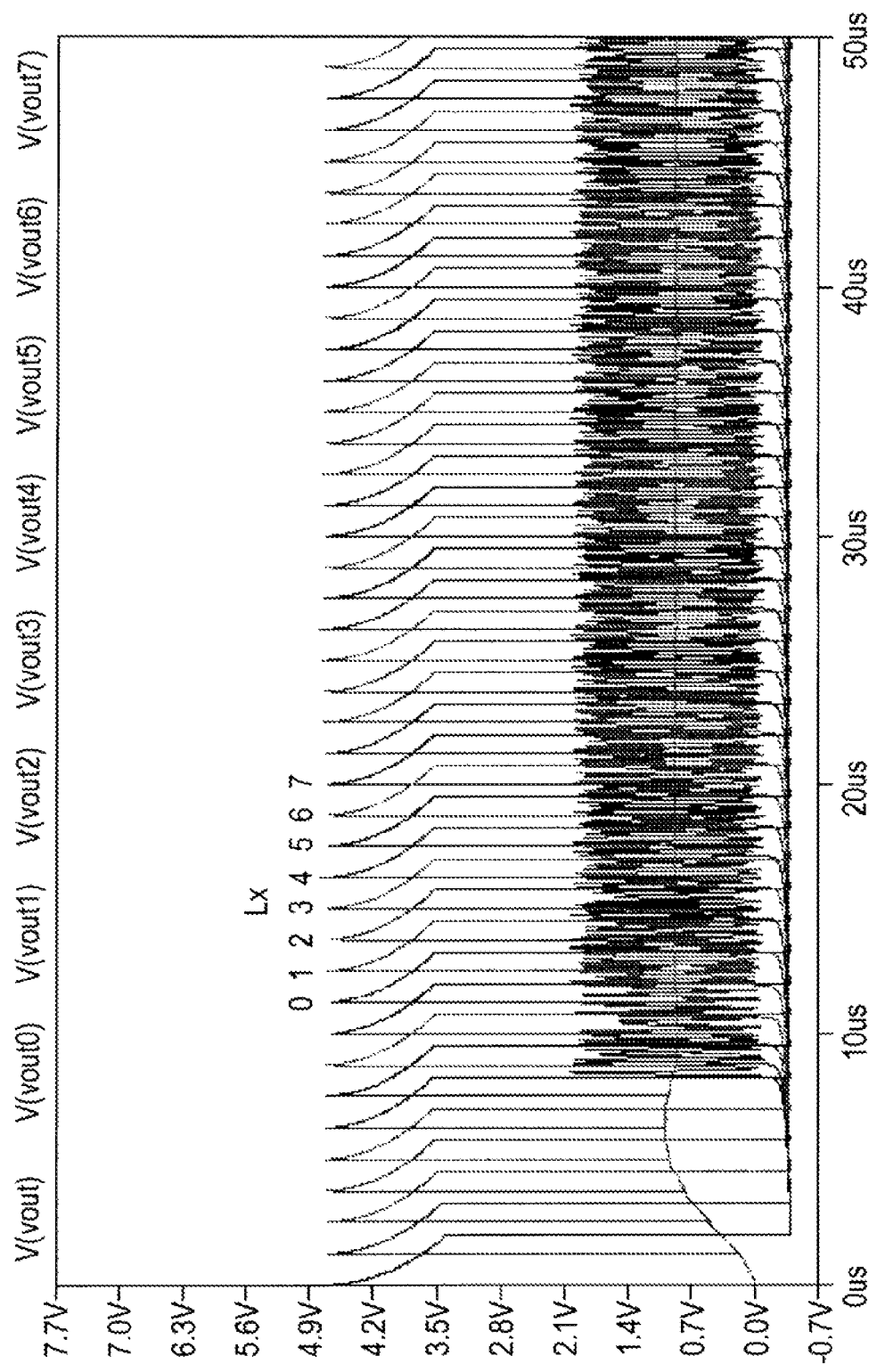
FIG. 15 is a waveform diagram of the connection nodes Lx of the eight-step sub-power supply module and the output voltages Vout when the load of the load circuit is heavy.

FIG. 15 is a waveform diagram of the connection nodes Lx of the eight-step sub-power supply module and the output voltages Vout when the load of the load circuit is heavy. This is an example where load is heavier than the example in FIG. 14. In this case, the connection nodes Lx_0 to Lx_7 of all the sub-power supply modules vertically fluctuate, and the sub-power supply modules perform ON/OFF operation evenly.

According to the power supply unit of this embodiment, the n phases of the pulses P_0 to P_n−1 in the n steps of the sub-power supply modules need not be shifted accurately by a 1/n cycle respectively. The n number of sub-power supply modules may be divided into k number of groups, and the phase of each group may be shifted by 1/k respectively. In the case of dividing the sub-power supply modules into two groups, for example, the sub-power supply modules may be divided into odd sub-power supply modules and even sub-power supply modules, so that an odd sub-power supply module and an even sub-power supply module switch alternately from the lower reference voltage Vref. At the worst, k=1 is also acceptable.

For the eight reference voltage Vref values as well, the difference of each voltage value need not be precisely the same, but it is sufficient if the difference is approximately the same.

Figure 16:
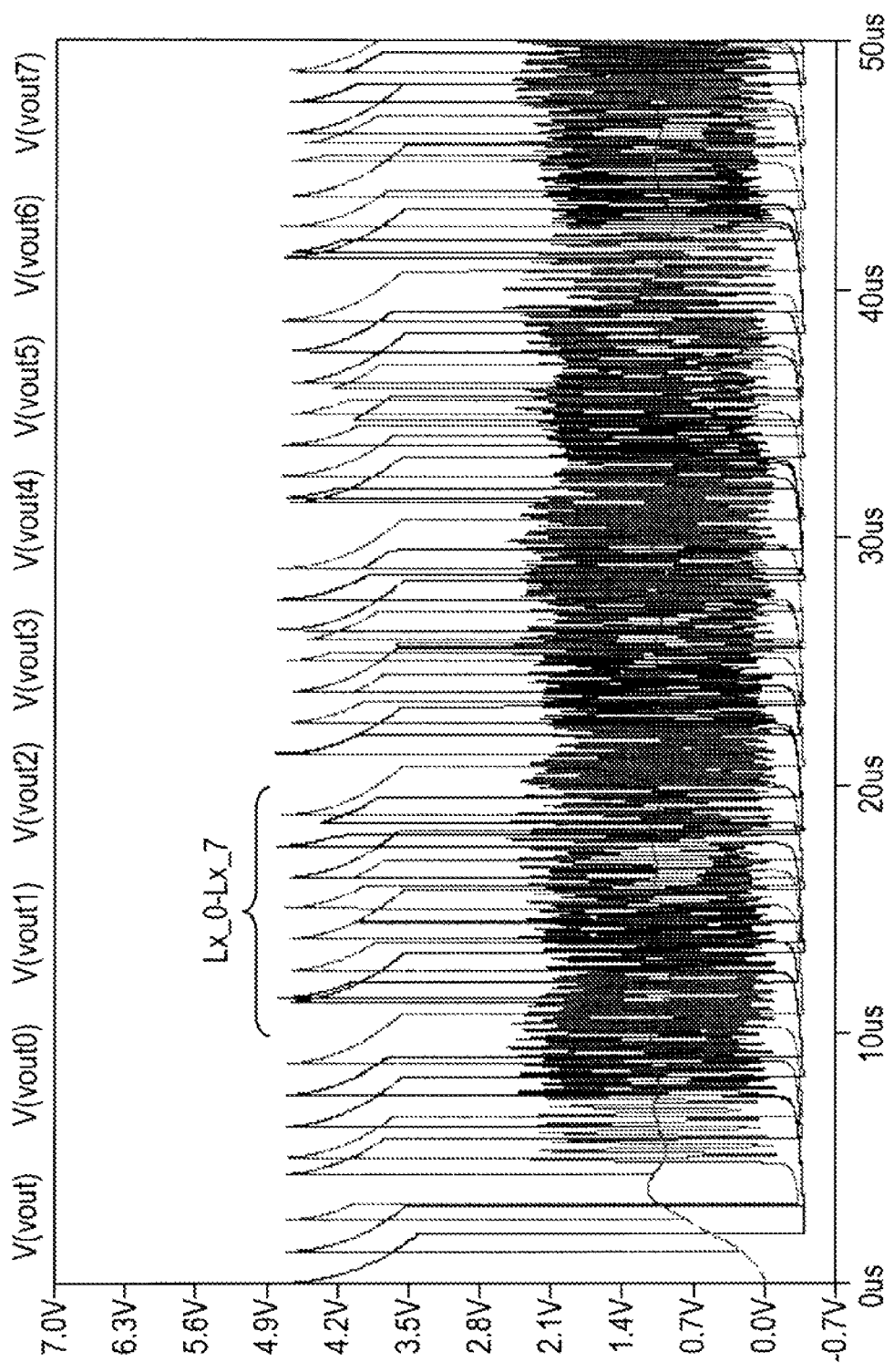
FIG. 16 is a waveform diagram when the difference of the reference voltage Vref in each step is not equal.

FIG. 16 is a waveform diagram when the difference of the reference voltage Vref in each step is not equal. This is an example where the load of the load circuit is heavy, like FIG. 15. However the vertically fluctuating timing of the connection node Lx is not even, as in the case of FIG. 15 since the eight reference voltage Vrf values are not equally spaced. In this case as well, a similar effect would be obtained since the timings are shifted appropriately.

In the power supply unit of this embodiment, it may be designed that the gate width of the switching transistor M1 is wider and the current drive capability is higher as the reference voltage Vref of the sub-power supply module is higher, and the gate width of the switching transistor M1 is narrower and the current drive capability is lower as the reference voltage Vref of the sub-power supply module is lower. As mentioned above, the frequency of the switching operation is higher and time thereof is longer as the reference voltage Vref of the sub-power supply module is higher, therefore the current supply capability of this module is increased so as to suppress fluctuation of the output voltage Vout, whereas the output voltage is boosted and the switching operation is stopped even more as the reference voltage Vref of the sub-power supply module is lower, therefore the current supply capability of this module is decreased so as to adjust the output voltage Vout at higher resolution.

Figure 17:
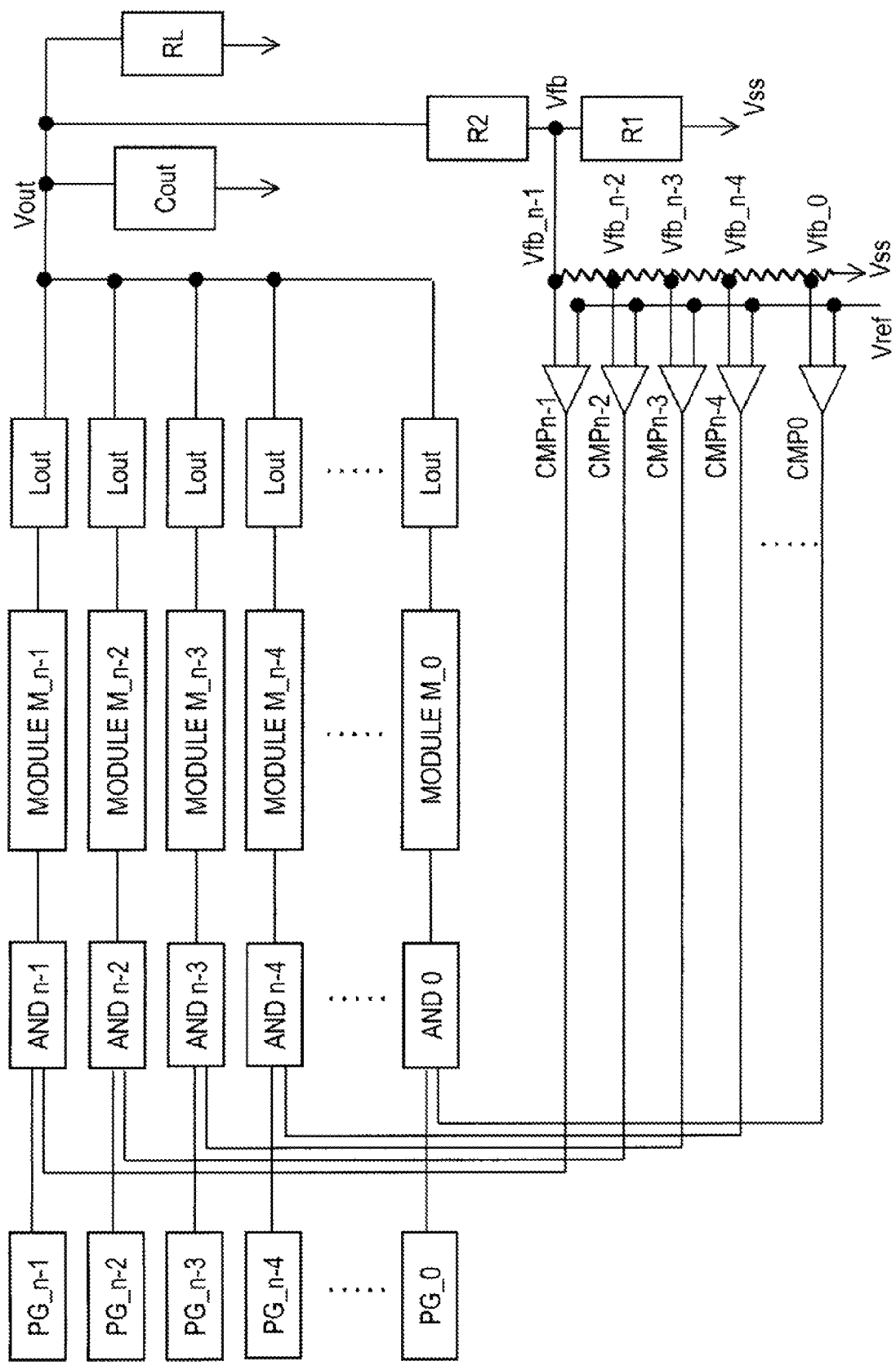
FIG. 17 is a diagram depicting a variant form of FIG. 1.

FIG. 17 is a diagram depicting a variant form of FIG. 1. In the example in FIG. 1, each reference voltage Vref_0 to Vref_n−1 to be input to the comparator CMP_0 to CMP_n−1 of each sub-power supply module is generated by the resistors dividing the output voltage between the voltage Vref_n−1 and the ground Vss. Whereas in the variant form in FIG. 17, the reference voltage Vref to be input to the comparator CMP_0 to CMP_n−1 of each sub-power supply module is common, and the feedback voltage Vfb is divided by the resistors. In other words, the feedback voltage to be input to the comparator CMP_0 to CMP_n−1 of each sub-power supply module is Vfb_0 to Vfb_n−1 in order from the lower voltage side.

Therefore in the case of the variant form in FIG. 17, contrary to the case of FIG. 1, the ON time is longer as the switching element M1 becomes closer to the sub-power supply module in the $0^{th}$ step, and is shorter as the switching element M1 becomes close to the sub-power supply module in the (n−1)th step, if the output voltage Vout is increasing in both FIG. 1 and FIG. 17 however, the potential of the output voltage Vout, at which each switching element M1 turns ON or OFF, is different in each of the plurality of the sub-power supply modules respectively.

[Second Embodiment, Step-Up Type Power Supply Unit]

Figure 18:
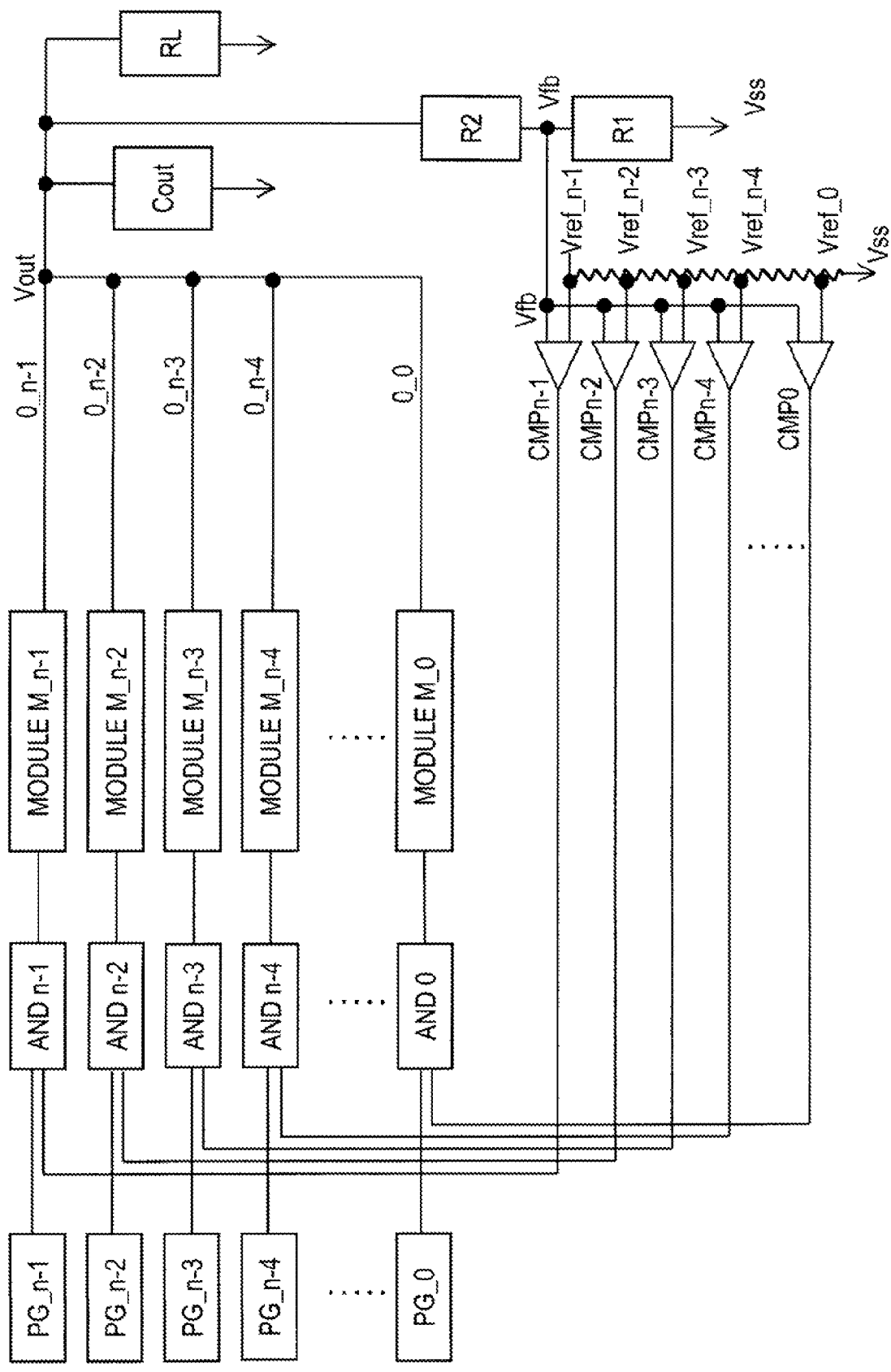
FIG. 18 is a block diagram depicting a step-up type power supply unit according to a second embodiment.

FIG. 18 is a block diagram depicting a step-up type power supply unit according to a second embodiment. The step-up type power supply unit, like the step-down type power supply unit, generates an output voltage for a common output terminal Vout by n steps of the sub-power supply modules. Each sub-power supply module has a module circuit M_0 to M_n−1 having an inductor (not illustrated), a pulse generation circuit PG_0 to PG_n−1, a comparator CMP_0 to CMP_n−1, and an AND gate AND_0 to AND_n−1 which outputs AND of the outputs of the pulse generation circuit and the comparator as a drive pulse. The comparator CMP_0 to CMP_n−1 compares a common feedback voltage Vfb and mutually different reference voltages Vref_0 to Vref_n−1 respectively, and outputs the comparison result signals. The sub-output terminals 0_0 to 0_n−1 of n number of sub-power supply modules are coupled to the common output terminal Vout, and a smoothing capacitor Cout is disposed at the common output terminal Vout, and a load circuit RL is coupled to the common output terminal Vout.

Figure 19:
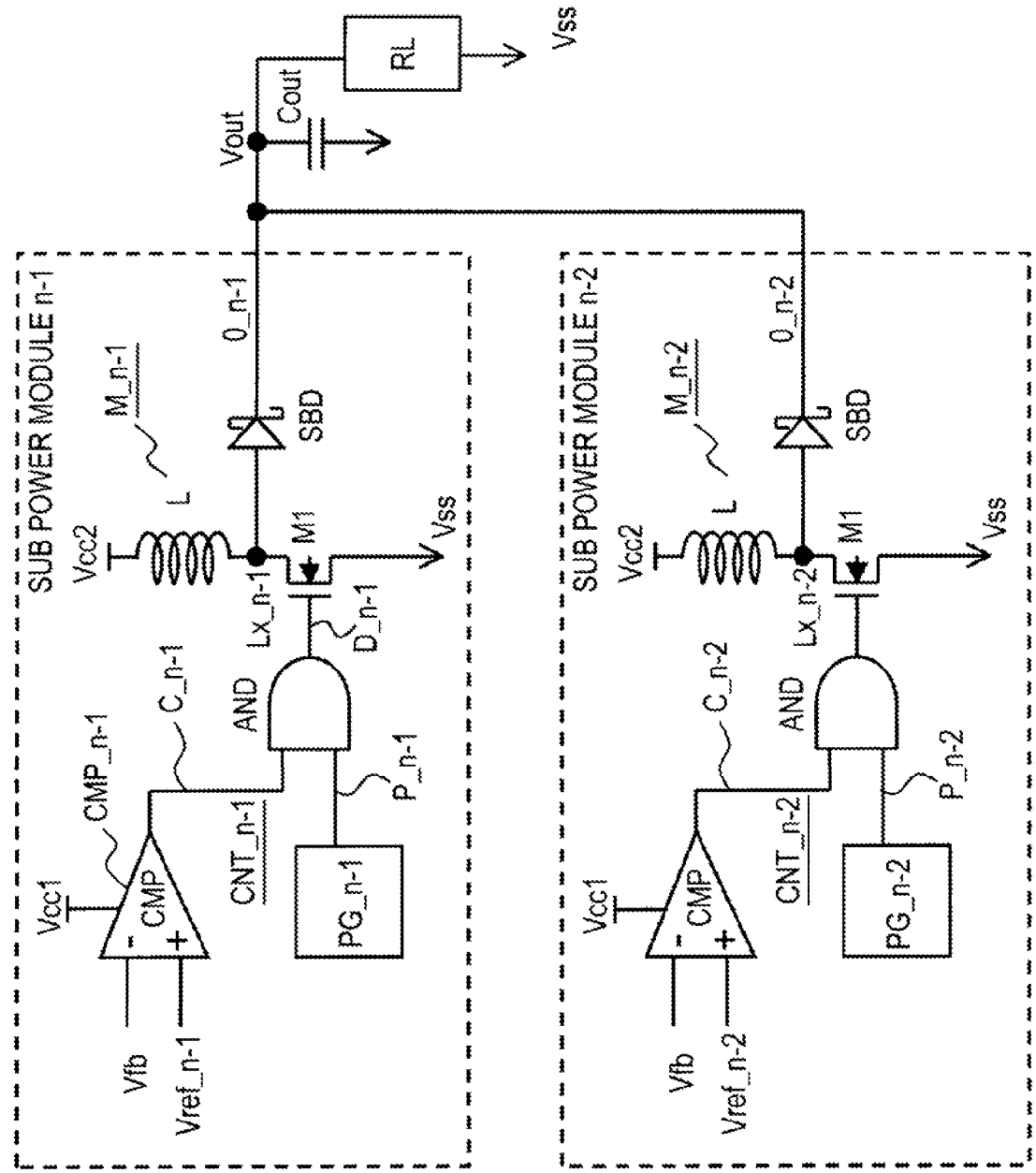
FIG. 19 is a circuit diagram of a sub-power supply module of the step-up type power supply unit in FIG. 18.

FIG. 19 is a circuit diagram of a sub-power supply module of the step-up type power supply unit in FIG. 18. The sub-power supply module in the (n−1)th step has a module circuit M_n−1 which includes an inductor L coupled to the power supply voltage Vcc2, a switching element M1 constituted by an N-channel MOS (NMOS) transistor disposed between the inductor L and the ground Vss, and a Schottky Barrier Diode SBD disposed between the connection node Lx_n−1 of the inductor L and the switching element M1 and a sub-output terminal 0_n−1. Furthermore, the sub-power supply module in the (n−1)th step also has an AND gate for supplying a drive pulse to the gate of the switching element M1, a comparator CMP_n−1, and a pulse generation circuit PG_n−1. The AND gate, the comparator CMP_n−1 and the pulse generation circuit PG_n−1 constitute a drive control circuit CNT_n−1 for driving the switching element M1.

The drive control circuit CNT_n−1 has a same configuration as the drive control circuit of the step-down type power supply circuit of the first embodiment, and operates in the same manner.

When the pulse signal P_n−1 is in the H level period, the switching element M1 turns ON, supplies current from the power supply Vcc2 to the inductor L, and stores the electromagnetic energy in the inductor L if the potential of the output voltage of the common output terminal Vout is lower than the potential corresponding to the reference voltage Vref_n−1. If the potential of the output voltage of the common output terminal Vout is higher than the potential corresponding to the reference voltage Vref_n−1 when the pulse signal P_n−1 is in the H level period, on the other hand, the switching element M1 turns OFF. If the switching element M1 turns OFF, current of the inductor L is output to the sub-output terminal O_n−1 via the Schottky Barrier Diode SBD by the electromagnetic energy stored in the inductor L. The switching element Mi repeats turning ON and OFF intermittently, but the current supplied to the output terminal is smoothed by the inductor L.

The sub-power supply module in the (n−2)th step has a configuration similar to the (n−1)th step. The reference voltage Vref_n−2 to be input to the comparator CMP_n−2, however, is lower than the reference voltage Vref_n−1 of the comparator in the (n−1)th step. The pulse generation circuit PG_n−2 generates a pulse signal, of which phase is shifted by a 1/n cycle from that of the (n−1)th pulse generation circuit. The duty ratios of the pulse signals are the same.

Therefore in the (n−2)th sub-power supply module, when the pulse P_n−2, of which phase is shifted from the pulse P_n−1 of the (n−1)th step, is the H level period, the switching element M1 turns ON or OFF by the comparison result signal C_n−2, which becomes H level if the feedback voltage Vfb is lower than the reference voltage Vref_n−2, and becomes L level if the feedback voltage Vfb is higher than the reference voltage Vref_n−2. In other words, the switching element M1 of the sub-power supply module in the (n−2)th step is controlled to be ON or OFF based on the potential of the output voltage Vout, which is lower than the sub-power supply module in the (n−1)th step, whereas the switching element M1 of the sub-power supply module in the (n−1)th step is controlled to be ON or OFF based on the potential of the output voltage Vout which is higher than the sub-power supply module in the (n−2)th step. In other words, if the feedback voltage Vfb, which is in proportion to the output voltage Vout, is lower than the reference voltage Vref_n−2, then both switching elements M1 in the (n−2)th step and the (n−1)th step turn ON, if the feedback voltage Vfb is Vref_n−2<Vfb<Vref_n−1, then only the switching element M1 in the (n−1)th step turns ON, and if the feedback voltage Vfb is higher than the reference voltage Vref_n−1, then the switching element M1 in the (n−1)th step as well as the switching element M1 in the (n−2)th step turns OFF.

The sub-power supply modules in the (n−3)th step to the $0^{th}$ step also have a similar configuration as the sub-power supply modules in the (n−1)th step and the (n−2)th step.

In the step-up type power supply unit of this embodiment, like the step-down type power supply unit in FIG. 1 and FIG. 2, the n steps of the sub-power supply modules perform the ON/OFF switching operation based on a different potential of the output voltage Vout. Since the potential of the output voltage Vout at which the switching element M1 turns ON is different in each step, the period when the switching element M1 turns ON is different in each step, and the ON duty ratio thereof is also different depending on the step. Therefore comparing with the case of the switching elements of all the sub-power supply modules which turn ON or OFF based on the same reference voltage Vref, the pulsation of the output voltage Vout is small, and the ripple becomes low.

In the case of the second embodiment as well, like FIG. 18 of the first embodiment, the comparators CMP of the n number of sub-power supply modules may compare the same reference potential Vref and a different feedback voltage Vfb_0 to Vfb_n−1 respectively. In this case, the ON duty ratio of each switching element of the n number of sub-power supply modules is longer as the switching element is closer to the $0^{th}$ step, and is shorter as the switching element is closer to the (n−1)th step.

[Third Embodiment]

In both the step-down type power supply unit and the step-up type power supply unit described in the first and second embodiments, n number of sub-power supply modules are coupled to the common output terminal Vout, and the ON/OFF operation of the switching element M1 in each sub-power supply module is switched based on a different potential of the output voltage Vout, whereby the ON duty ratio of each switching element M1 is different from other switching elements. In any case, the inductor Lout or L is disposed, and the smoothing capacitor Cout is disposed at the common output terminal Vout.

In the above power supply unit, the circuit configuration of the sub-power supply module is simple, therefore a higher number of sub-power supply modules may be installed, and increasing the number of sub-power supply modules may decrease the inductance of the inductor Lout or L, and since the current amount from each sub-power supply module is low, capacitance of the smoothing capacitor Cout may also be decreased.

According to the third embodiment, the number of sub-power supply modules is increased to 1000, 10,000, 100,000 or 1,000,000, for example, and the inductor and capacitor are replaced with a parasitic inductance and parasitic capacitance of wirings in the integrated circuit device. In other words, the parasitic inductor and parasitic capacitor of the wirings in the semiconductor circuit device are used, instead of disposing an inductor element and a capacitor element independently.

Figure 20:
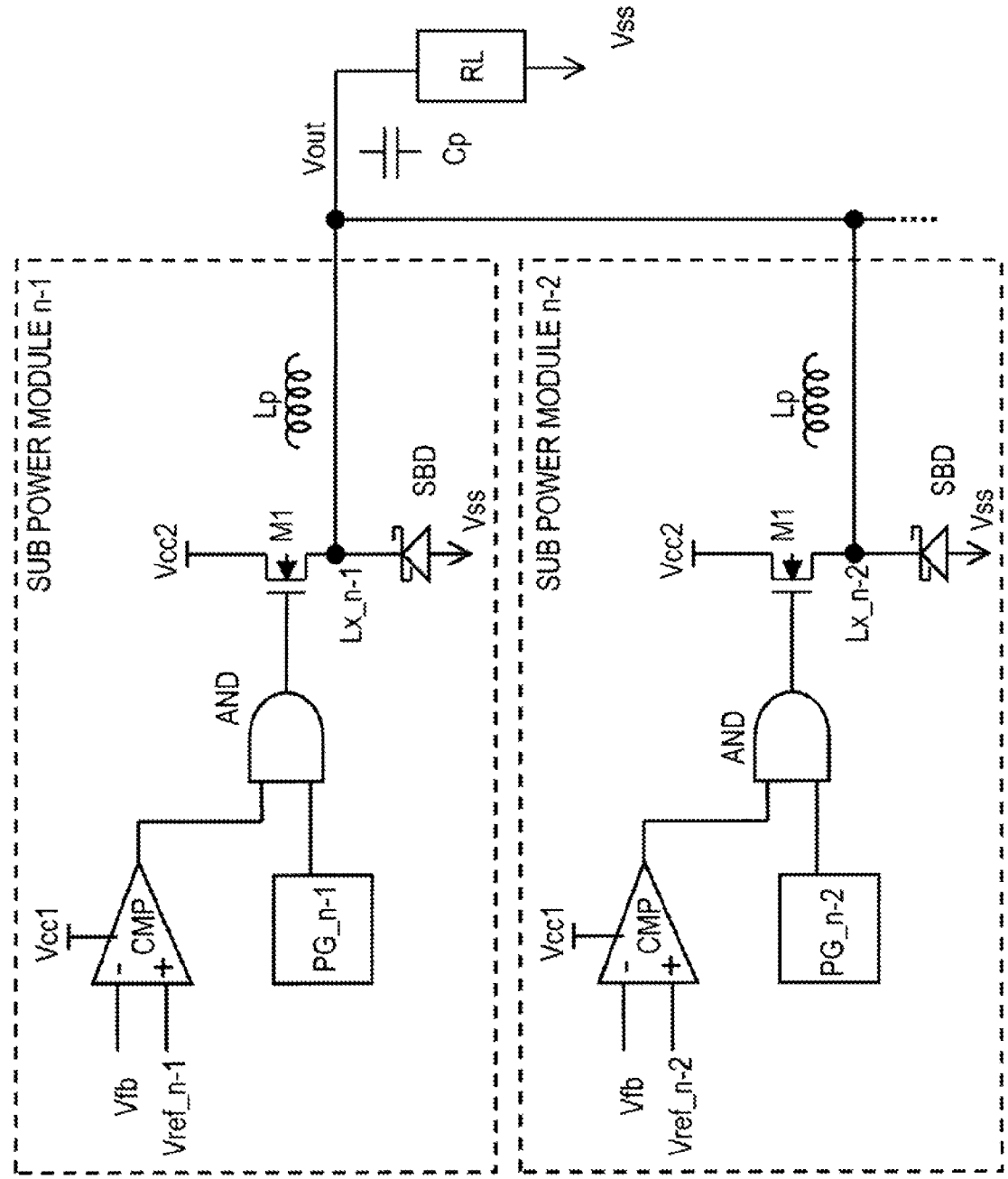
FIG. 20 is a circuit diagram of a sub-power supply module of a step-down type power supply unit circuit according to the third embodiment.

FIG. 20 is a circuit diagram of a sub-power supply module of a step-down type power supply unit circuit according to the third embodiment. Differences from the circuit in FIG. 2 are that the inductor Lout is not disposed between the connection node Lx_n−1 or Lx_n−2 and the output terminal Vout, and the smoothing capacitor Cout is not disposed at the output terminal Vout. The parasitic inductor Lp generated in the wiring between the connection node Lx_n−1 or Lx_n−2 and the output terminal Vout is used as the smoothing coil. In the same manner, the parasitic capacitor Cp generated at the output terminal Vout is used as the smoothing capacitor.

Figure 21:
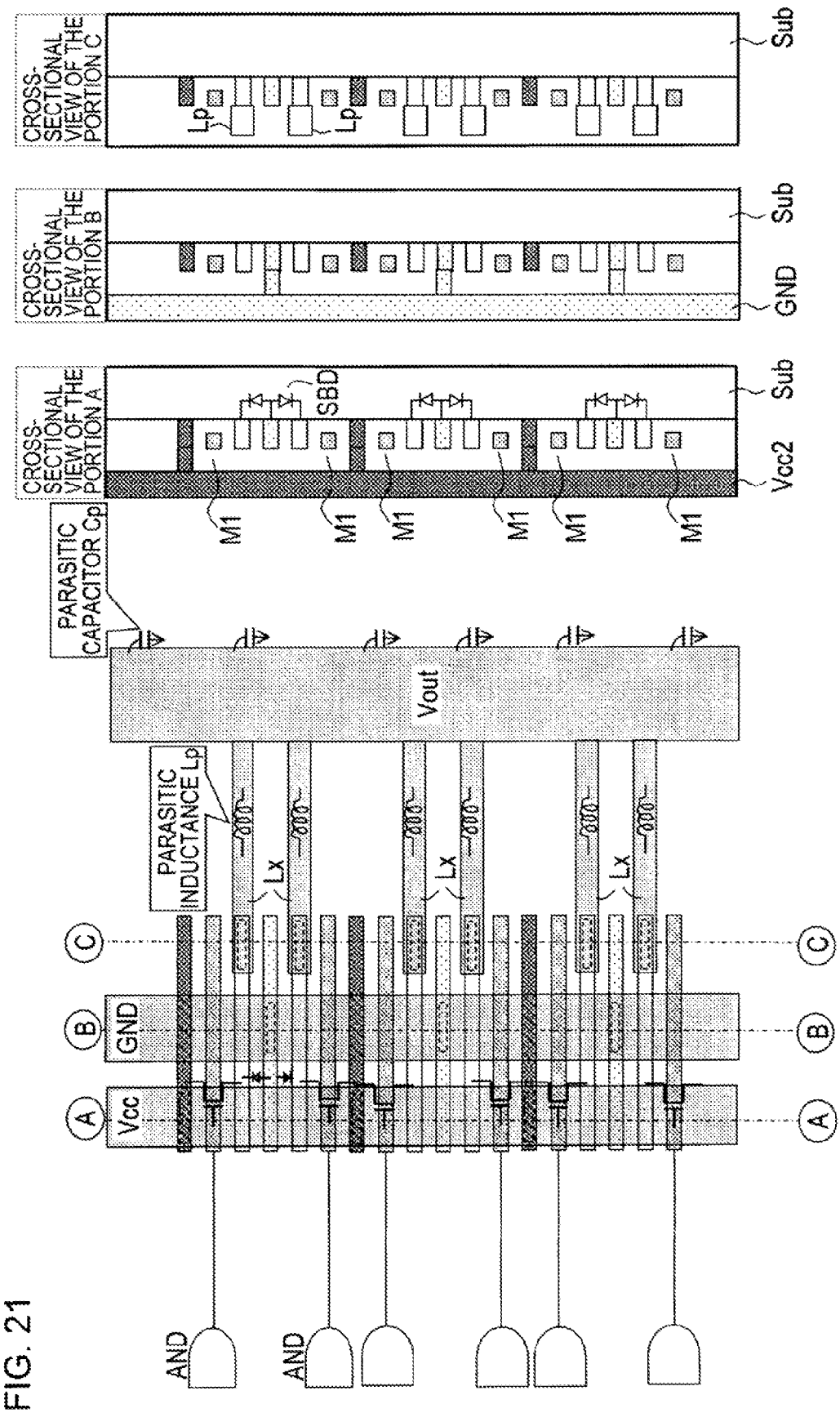
FIG. 21 is a plan view and cross-sectional views of an integrated circuit device having the power supply unit circuit in FIG. 20.

FIG. 21 is a plan view and cross-sectional views of an integrated circuit device having the power supply unit circuit in FIG. 20. The plan view, is illustrated at the left side of FIG. 21, and the cross-sectional views sectioned at positions A, B and C in the plan view, are illustrated at the right side. In FIG. 21, an AND gate, a switching transistor Ml, a parasitic inductor Lp, a common output terminal Vout, and a parasitic capacitor Cp disposed at the common output terminal Vout are illustrated for six sub-power supply modules. The output of each AND gate is coupled to a gate electrode of the switching transistor M1 via a gate electrode wiring, and the parasitic inductor Lp, having inductance that is sufficient for a thin wiring between a connection node Lx of the switching transistor M1 and a Schottky barrier diode and the output terminal Vout, is formed. As the wiring width becomes narrower, the inductance of the parasitic inductor Lp increases. A conductor layer having a wide area, where the thin wirings from the plurality of sub-power supply modules are coupled, becomes the output terminal Vout, and the parasitic capacitor Cp, which is allowed to have a sufficient capacitance because of this wide area, is formed. As the area of the conductor layer of the output terminal Vout increases, the capacitance of the parasitic capacitor Cp increases.

In the cross-sectional view of the portion A, the gate electrode of the switching transistor M1 is located under the wiring of the power supply Vcc2. In the cross-sectional view of the portion B, the wiring of the ground GND (Vss) is illustrated, and the gate electrode of the switching transistor M1 is located there under. And in the cross-sectional view of the portion C, a thin wiring having the parasitic inductance Lp is illustrated respectively.

Figure 22:
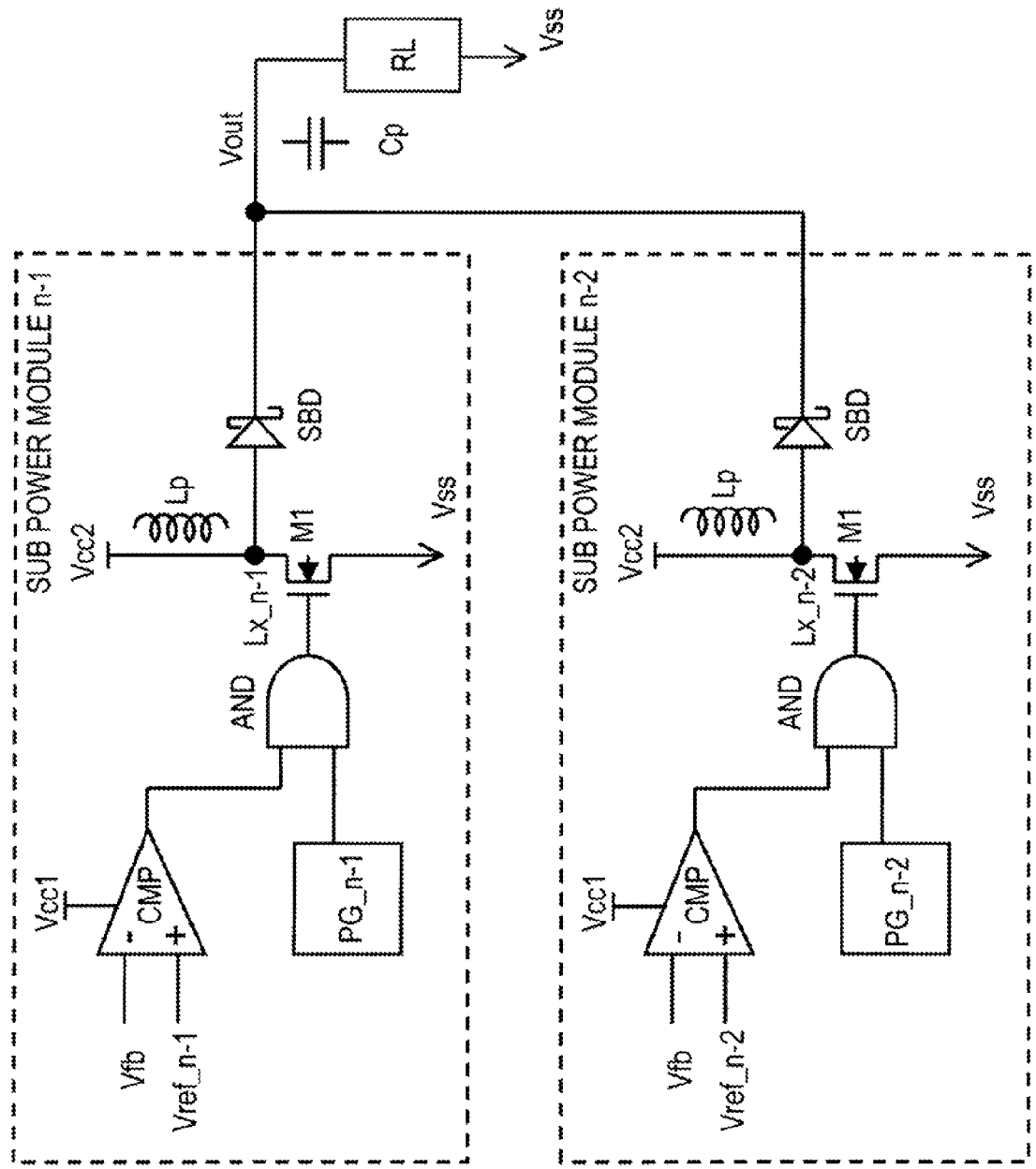
FIG. 22 is a circuit diagram of a sub-power supply module of a step-up type power supply unit circuit according to the third embodiment.

FIG. 22 is a circuit diagram of a sub-power supply module of a step-up type power supply unit circuit according to the third embodiment. Differences from the circuit in FIG. 19 are that the inductor L is not disposed between the input power supply Vcc2 and the connection node Lx_n−1 or Lx_n−2, and the smoothing capacitor Cout is not disposed in the output terminal Vout. The parasitic inductor Lp, which is generated in the wiring between the input power supply Vcc2 and the connection node Lx_n−1 or Lx_n−2, is used as a smoothing coil. In the same manner, the parasitic capacitor Cp, generated at the output terminal Vout, is used as the smoothing capacitor.

The structure of the integrated circuit device in which the sub-power supply modules are formed in FIG. 22 is the same as FIG. 21. In other words, each parasitic inductor Lp is formed in the thin wiring between the input power supply Vcc2 and the connection node Lx_n−1 or Lx_n−2, and the parasitic capacitor Cp is formed in the wide conductor layer of the common output terminal Vout.

Thus according to the third embodiment, the number of sub-power supply modules is increased using a drive control circuit of each sub-power supply module having a simple circuit configuration, and an area of the sub-power supply modules on the integrated circuit is decreased. Accordingly the inductor Lout or L of each sub-power supply module is decreased accordingly to the size of the parasitic inductor, and the smoothing capacitor Cout is decreased approximately to the size of the parasitic capacitor. As a result, several thousand to several million sub-power supply modules may be integrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A power supply unit comprising:
   a first sub-power supply module, comprising a first inductor, a first switching element which switches current supplied from an input power supply to the first inductor, a first drive control circuit which drives the first switching element, and a first sub-output terminal to which current is output from the first inductor;

a second sub-power supply module, comprising a second inductor, a second switching element which switches current supplied from an input power supply to the second inductor, a second drive control circuit which drives the second switching element, and a second sub-output terminal to which current is output from the second inductor; and a common output terminal to which the first sub-output terminal and the second sub-output terminal are coupled, wherein an ON operation of the first switching element is controlled depending on whether or not an output voltage of the common output terminal is lower than a first voltage, and an ON operation of the second switching element is controlled depending on whether or not the output voltage is lower than a second voltage, which is different from the first voltage the first drive control circuit compares a feedback voltage corresponding to the output voltage with a first reference voltage, turns the first switching element ON if the feedback voltage is lower than the first reference voltage, and turns the first switching element OFF if the feedback voltage is higher than the first reference voltage, and the second drive control circuit compares the feedback voltage with a second reference voltage that is different from the first reference voltage, turns the second switching element ON if the feedback voltage is lower than the second reference voltage, and turns the second switching element OFF if the feedback voltage is higher than the second reference voltage, wherein the first drive control circuit and the second drive control circuit each further comprise a comparator for comparing the feedback voltage with the reference voltage and outputting a comparison result signal, and perform ON/OFF control for the first switching element and the second switching element according to the comparison result signal respectively, and wherein the first drive control circuit and the second drive control circuit each further comprise a pulse generator for generating a pulse signal, phases of the pulse signals being shifted from each other, and perform ON/OFF control by supplying the comparison result signal to the first switching element or the second switching element respectively while the pulse signal is in an H level period or an L level period.

2. A power supply unit comprising:

a first sub-power supply module, comprising a first inductor, a first switching element which switches current supplied from an input power supply to the first inductor, a first drive control circuit which drives the first switching element, and a first sub-output terminal to which current is output from the first inductor;

a second sub-power supply module, comprising a second inductor, a second switching element which switches current supplied from an input power supply to the second inductor, a second drive control circuit which drives the second switching element, and a second sub-output terminal to which current is output from the second inductor; and a common output terminal to which the first sub-output terminal and the second sub-output terminal are coupled, wherein an ON operation of the first switching element is controlled depending on whether or not an output voltage of the common output terminal is lower than a first voltage, and an ON operation of the second switching element is controlled depending on whether or not the output voltage is lower than a second voltage, which is different from the first voltage, wherein the first drive control circuit compares a first feedback voltage corresponding to the output voltage with a reference voltage, and turns the first switching element ON if the first feedback voltage is lower than the reference voltage, and turns the first switching element OFF if the first feedback voltage is higher than the reference voltage, the second drive control circuit compares a second feedback voltage which corresponds to the output voltage and is different from the first feedback voltage with the reference voltage, and turns the second switching element ON if the second feedback voltage is lower than the reference voltage, and turns the second switching element OFF if the second feedback voltage is higher than the reference voltage, wherein the first drive control circuit and the second drive control circuit each further comprise a comparator for comparing the feedback voltage with the reference voltage and outputting a comparison result signal, and perform ON/OFF control for the first switching element and the second switching element according to the comparison result signal respectively, and wherein the first drive control circuit and the second drive control circuit each further comprise a pulse generator for generating a pulse signal, phases of the pulse signals being shifted from each other, and perform ON/OFF control by supplying the comparison result signal to the first switching element or the second switching element respectively while the pulse signal is in an H level period or an L level period.

3. A power supply unit comprising:

a first sub-power supply module to an Nth sub-power supply module which output current from an input power supply to respective sub-output terminals; and a common output terminal to which the first sub-output terminal to the Nth sub-output terminal are coupled, wherein each of the first sub-power supply module to the Nth sub-power supply module comprises an internal wiring, a switching element which switches current supplied from the input power supply to a parasitic inductor included in the internal wiring, and a drive control circuit which drives the switching element, current being output from the parasitic inductor to the sub-output terminal, and the drive control circuit controls an ON operation of the switching element depending on whether or not a potential of an output voltage of the common output terminal is lower than a reference potential, and the reference potential to control the ON operation of the switching element is different in the first sub-power supply module to the Nth sub-power supply module, wherein the first sub-power supply module to the Nth sub-power supply module are disposed on a single semiconductor chip, and N is at least 1000.

4. The power supply unit according to claim 3, wherein in each of the first sub-power supply module to the Nth sub-power supply module, the switching element is disposed between the input power supply and a first terminal of the internal wiring including the parasitic inductor, and a second terminal of the internal wiring is coupled to the sub-output terminal, and the output voltage of the common output terminal is lower than a voltage of the input power supply.

5. The power supply unit according to claim 3, wherein
in each of the first sub-power supply module to the Nth sub-power supply module, a first terminal of the internal wiring including the parasitic inductor is coupled to the input power supply, the switching element is disposed between a second terminal of the internal wiring and a reference voltage, and the second terminal of the internal wiring is coupled to the sub-output terminal via a unidirectional element, and
the output voltage of the common output terminal is higher than a voltage of the input power supply.

* * * * *